(12) United States Patent
Sherlock et al.

(10) Patent No.: US 6,882,709 B1
(45) Date of Patent: Apr. 19, 2005

(54) ENHANCED BROADBAND TELEPHONY SERVICES

(75) Inventors: Peter Sherlock, Doylestown, PA (US); William H. Blum, Harleysville, PA (US); Marc W. Kauffman, Fort Washington, PA (US); Charles Eldering, Doylestown, PA (US); M. Lamine Sylla, New Britain, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/549,004

(22) Filed: Apr. 14, 2000

Related U.S. Application Data
(60) Provisional application No. 60/129,222, filed on Apr. 14, 1999.

(51) Int. Cl.$^7$ ............................................. H04M 11/00
(52) U.S. Cl. ............................. 379/90.01; 379/88.25; 379/102.03; 348/468; 348/564
(58) Field of Search ........................ 379/68, 87, 88.13, 379/88.12, 88.11, 88.25, 102.03, 93.23, 93.24, 90.01; 348/468, 486, 564

(56) References Cited

U.S. PATENT DOCUMENTS

| | | | | |
|---|---|---|---|---|
| 5,629,978 A | * | 5/1997 | Blumhardt et al. | 370/271 |
| 5,651,054 A | * | 7/1997 | Dunn et al. | 379/88.11 |
| 5,751,373 A | | 5/1998 | Ohyama et al. | |
| 5,796,394 A | * | 8/1998 | Wicks et al. | 345/751 |
| 5,946,386 A | * | 8/1999 | Rogers et al. | 379/265.09 |
| 6,061,719 A | * | 5/2000 | Bendinelli et al. | 709/218 |
| 6,263,507 B1 | * | 7/2001 | Ahmad et al. | 725/134 |
| 6,323,911 B1 | * | 11/2001 | Schein et al. | 348/552 |

* cited by examiner

*Primary Examiner*—Fan Tsang
*Assistant Examiner*—Simon Sing
(74) *Attorney, Agent, or Firm*—Robert P. Marley; Esteban A. Rockett; Wendy W. Koba

(57) ABSTRACT

An enhanced telephony services manager is used in a broadband communication environment, such as with a set-top-box coupled to a television monitor. A number of different telephony-based services can be offered and displayed on the television monitor (e.g., voice mail, call logs, Internet access, personal telephone directories, white pages, yellow pages, etc.), where a remote control, keyboard, or any other suitable interface device can be used to access the services. In accordance with the present invention, the GUI of the enhanced services consists of a set of menus that can be displayed concurrently with other video information on the television monitor.

28 Claims, 23 Drawing Sheets

ENHANCED BROADBAND TELEPHONY SERVICES

Priority of Provisional Application No. 60/129,222, filed Apr. 14, 1999, is hereby claimed.

TECHNICAL FIELD

The present invention is directed to the provisioning of enhanced telephony services provided via a broadband network and, more particularly, to a system for managing various enhanced telephony service offerings.

BACKGROUND OF THE INVENTION

A key differentiator between cable and other communication delivery systems is the existence of a broadband and bidirectional "pipe" between the head end and the subscribers' homes. In today's telecommunications industry, such a broadband, bidirectional network is useful in providing a myriad of telecommunication services, well beyond the traditional "plain old telephone service" (POTS).

An exemplary prior art attempt for provisioning and customizing telecommunication services over a broadband network is disclosed in U.S. Pat. No. 5,629,978, issued to Blumhardt et al. on May 13, 1997. Blumhardt et al. describe an arrangement where switch-based and advanced intelligent network (AIN) services are offered via a broadband (e.g., cable) network, using a television monitor as a graphical user interface (GUI), where the offered services are accessed using a set-top box and remote control. Switch-based calling features such as, for example, call waiting and caller ID, are implemented in this environment and can be activated/deactivated by the subscriber. AIN services are provided by presenting the subscriber with a "blank" screen, the subscriber then activating the desired AIN options. Once activated, a remote database is used to control the AIN services provided to the customer.

The use of a remote database is considered to be limited in the services available to the subscriber. Further, the lack of privacy associated with a remote database may cause subscribers to be hesitant in activating certain AIN services.

SUMMARY OF THE INVENTION

The present invention is directed to the provisioning of enhanced telephony services provided via a broadband network and, more particularly, to a system for managing various enhanced telephony service offerings.

In accordance with the present invention, an enhanced telephony services management system includes a local database (e.g., within a set-top box) used in conjunction with network-based mail systems to provide a multitude of different telephony services via a broadband network. For example, a personal telephone directory may be stored within the local database and activated (by a remote control, for example) to initiate a call (voice or video) to another party. Both "white" pages and "yellow" pages listings (resident in a network database) may similarly be accessed by the management system to retrieve information for the system subscriber. Organization of incoming/outgoing voice mail, email, faxes, etc., may also be provided by using a local database (either alone or in conjunction with a network directory), including "call logs" of all call history information. Other service offerings, such as an Internet connection, may also be launched via the broadband connection.

A graphical user interface, such as a television monitor, is suitable for use with the broadband telephony enhanced services of the present invention, where in any particular embodiment the telephony services may appear as a "menu" across the screen, allowing any television show (or other video presentation) to continue in an uninterrupted fashion.

Other and further aspects of the present invention will become apparent during the course of the following discussion, and by reference to the accompanying drawings.

BRIEF DESCRIPTION OF THE DRAWINGS

Referring now to the drawings.

DETAILED DESCRIPTION

The enhanced broadband telephony services platform of the present invention provides additional services to the subscriber beyond those provided in traditional cable, telephony or IP telephony systems. The platform of the present invention uses the combination of a set top box and television monitor (or other suitable display device) to provide new interfaces and services to the subscriber. In particular, the use of the set top/television platform allows the subscriber to interface through the television video and audio systems, and permits control/data entry through the use of a remote control, remote keyboard, or other suitable interface device.

Use of the set top/television platform provides a graphical interface for service control and allows these services to be integrated with traditional broadcast and Internet-based video services. Subscribers can be alerted to call events via the television screen, as well as be able to configure and control their services through the platform. Further, the television audio system can be used as part of the enhanced telephony system. In particular, microphonic capability can be implemented in the set top to support two-way voice communication. As the migration toward video telephony occurs, the set top will be able to support two-way video conferencing. The inherent video and audio processing capabilities of the set top will permit high quality conference calls to be established.

Figure 1:
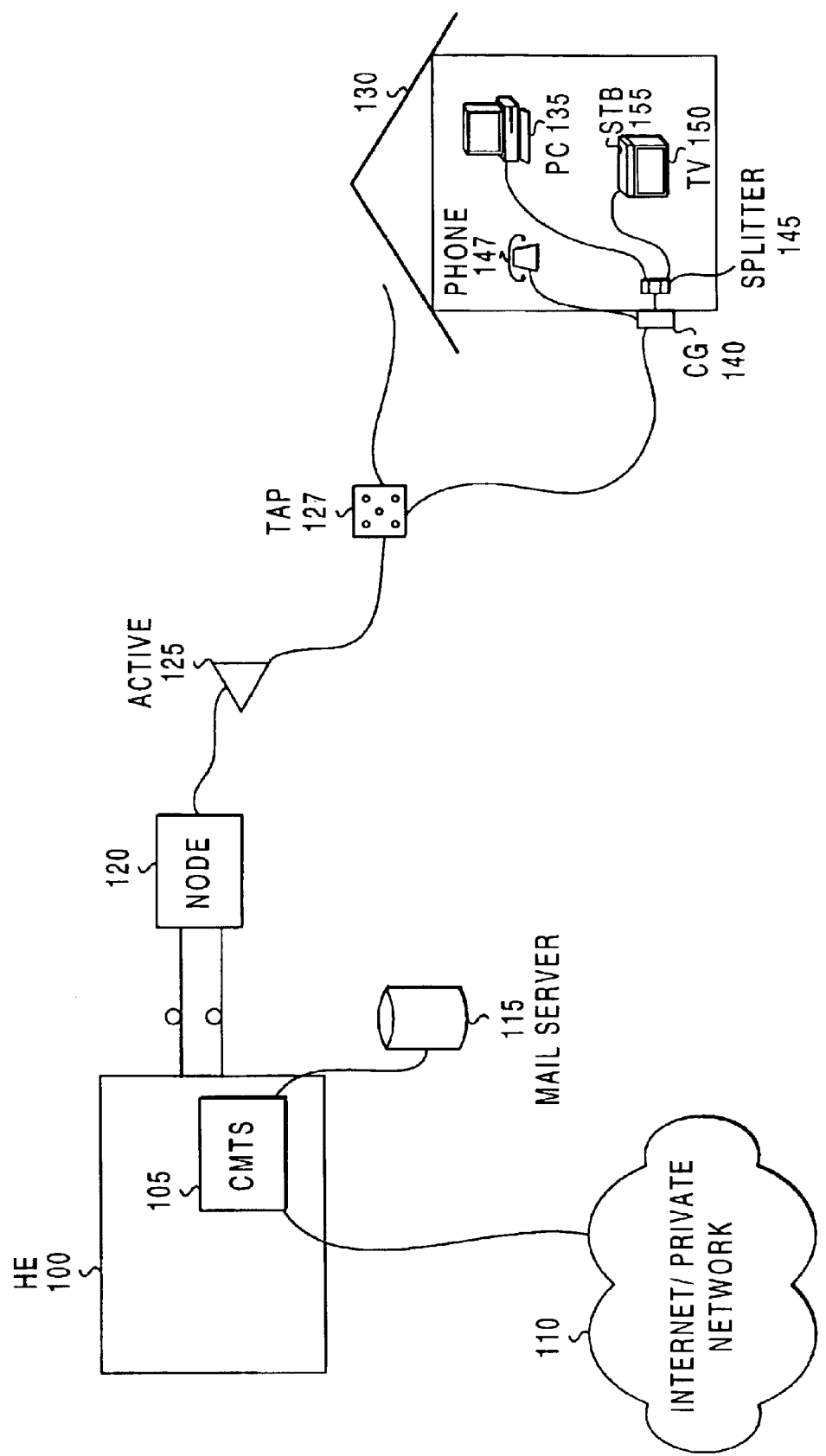
FIG. 1 illustrates an exemplary network architecture capable of supporting the broadband enhanced telephony services of the present invention.

An exemplary network architecture suitable for discussing the enhanced telephony services management system of the present invention is illustrated in FIG. 1. Although the portion of the network as illustrated in FIG. 1 includes only a single node 120 and residence 130, it is to be understood that a complete network comprises an architecture encompassing a plurality of nodes, each node serving multiple residences, through a number of active devices 125 and taps 127 associated with each branch. For the sake of clarity and the purposes of the present discussion, the illustration has been simplified as shown.

In particular, FIG. 1 illustrates an exemplary bi-directional broadband (e.g., cable) system comprising a head end 100 and a cable modem termination system (CMTS) 105, where CMTS 105 is in communication with a public-switched telephone network (PSTN) 107, a data/private network 110 (i.e., the Internet), and a network mail service 115. Although not shown, head end 100 also contains return path receiving equipment that can receive signals from fiber optic cables 108. In a preferred embodiment, separate fiber optic cables are used for the transmission of optical signals from head end 100 to node 120, and for the return of optical signals from node 120 to head end 100, as indicated by the arrows in FIG. 1.

Within node 120, the lightwave signals are converted into electrical representations and thereafter transmitted over coaxial cable 109 and through an active amplifier 125. The signals are intercepted by a tap 127, which routes a portion of the signal to a communication gateway (CG) 140 located at or near a residence 130. A drop cable 221, as shown in FIG. 1, is used to connect tap 127 to CG 140. In a preferred embodiment, drop cable 221 comprises a coaxial cable. Additionally, as used herein, the term "communication gateway" or "CG" refers to a device for transmitting and receiving data, voice or video signals over a hybrid fiber/coax (HFC) network. Alternative terminology for such a communication gateway includes a "broadband terminal interface" (BTI) or "coaxial termination unit" (CTU). Therefore, the term "communication gateway" is not intended to be limiting and is understood to encompass any equipment which is located on the outside of the home, or in the home in a centralized location such as an attic, basement or equipment closet, or in another location in the home. Businesses can also use communications gateway-type devices for the transmission and reception of data, voice and/or video signals.

As illustrated in FIG. 1, residence 130 is shown as containing a set-top box (STB) 155 which is typically connected to a television 150, and a PC 135 which can contain a cable modem. These units are typically connected through a splitter 145 to communication gateway 140. A telephone 147 can be supported by communication gateway 140 which provides traditional voice services by transmitting and receiving telephone signals and converting them to cable-compatible signals. Telephone service supported by CG 140 may be circuit-switched or Internet Protocol (IP)-based telephone services. Signals from CMTS 105 can be routed to either Internet/private network 10 (for the IP-based telephone services) or PSTN 107 (for circuit-switched traffic). In the distributed architecture, some of the enhanced telephony services platform functionality is included in CG 140, while the remainder of the functionality is included in set top 155 (or PC 135). CM 140 can communication with set top 155 in a number of different ways and works in conjunction with set top 155 to provide the services to be described below. For example and as described in detail below, set top 155 may contain directory entities, a pop-up menu generator, user interface, multimedia devices and a text/graphics processor, while CG 140 contains the remaining modules required to implement the enhanced telephony services.

In accordance with the present invention, a network mail service 115 is also coupled to CMTS 105 and is used, in conjunction with software resident within STB 155 to provide advanced messaging services to a subscriber, where the messages can be viewed on the television screen, or any other monitor associated with STB 155.

Figure 2:
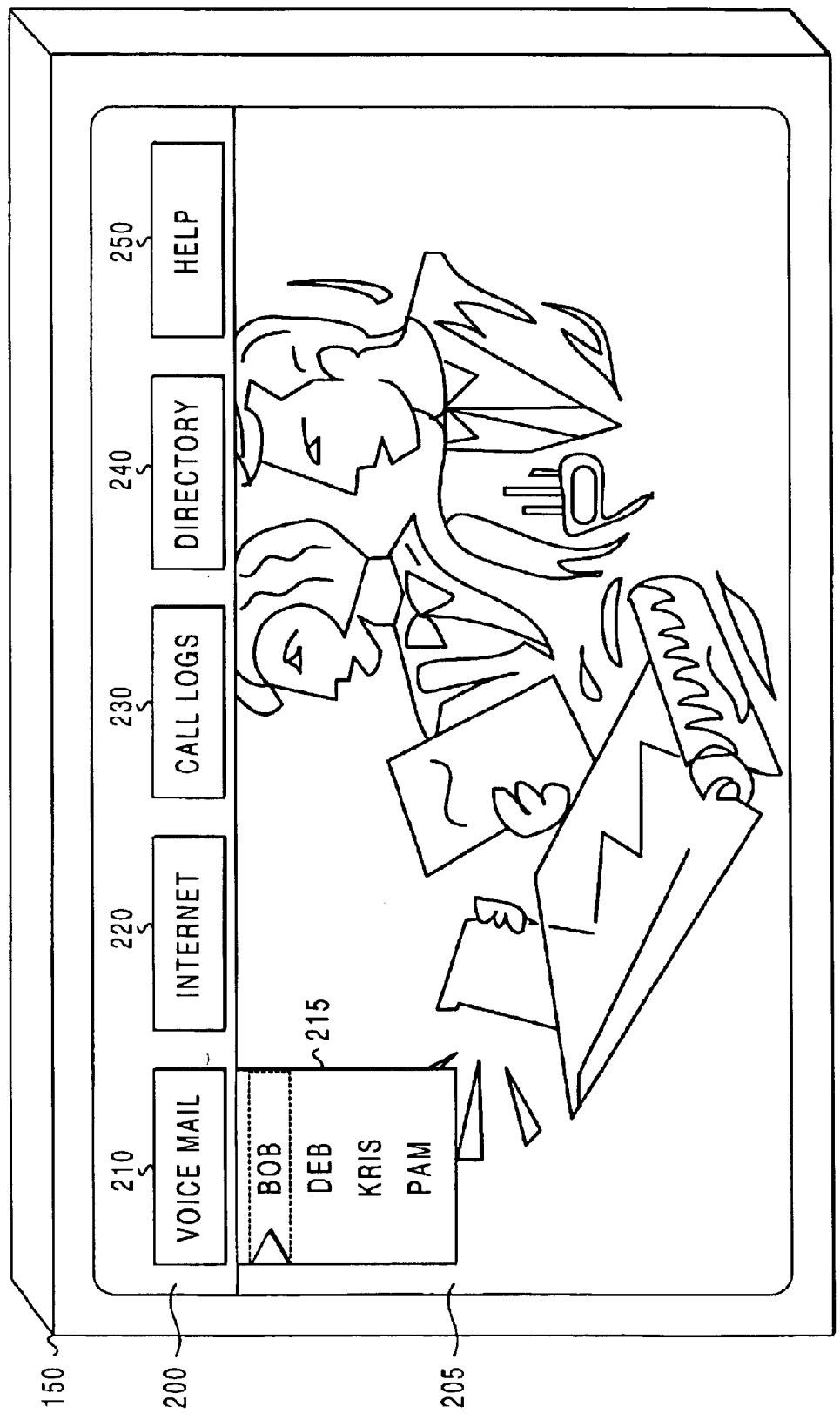
FIG. 2 is a diagram of an exemplary monitor (e.g., television set) including the "menu"/user interface associated with the enhanced telephony services of the present invention.

Referring to FIG. 2, an exemplary video screen (for example, a TV monitor) 150 is shown. An exemplary menu 200 denoting a set of advanced features is displayed as part of the video display, with conventional TV programming 205 being concurrently displayed with menu 200. In this manner, a subscriber may be viewing a television show and, simultaneously, decide to check voice mail, look up a telephone number in his personal directory, or initiate any of the other illustrated functions. The initiation of the "enhanced telephony services" menu may be controlled by a remote control, a keyboard, a mouse, or any other suitable interface device that is used to communicate with set top box 155. For the purposes of the present discussion, the use of a "remote control", in communication with set top box 155 will be presumed. In the specific embodiment as shown in FIG. 2, the enhanced telephony services shown on menu 200 include: voice mail 210, Internet access 220, call logs 230, telephone directory 240 and "help" 250. These various enhanced telephony services will be discussed in detail below. In the particular illustration of FIG. 2, the subscriber has activated (via a remote control, for example) voice mail 210, causing a pull-down menu of each "mailbox" 215. The subscriber can then scroll through the list of telephone calls that have been received (by using, for example, a particular key on the remote).

Figure 3:
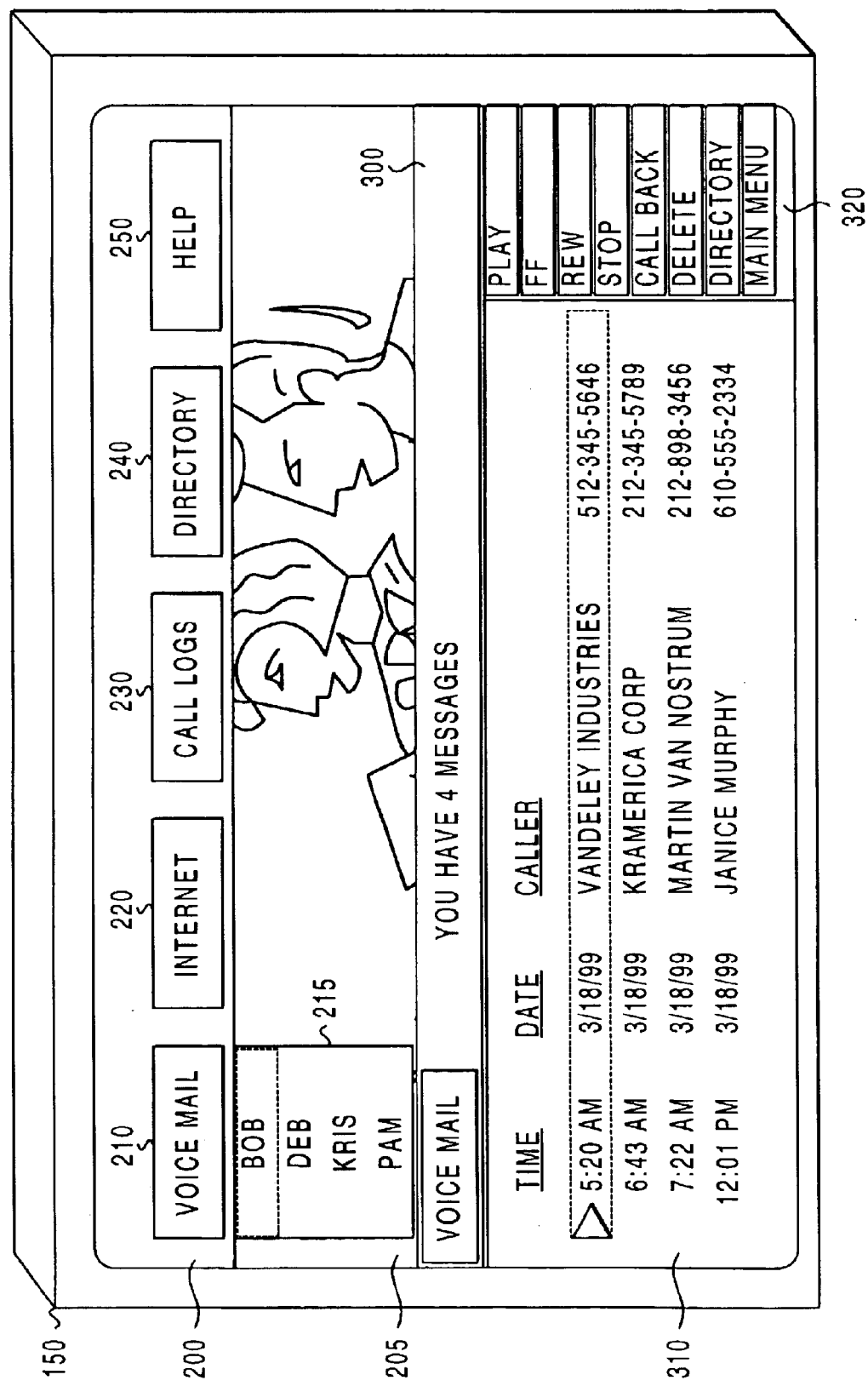
FIG. 3 illustrates in particular the activation of the user interface to enter a subscriber-based voice mail "mailbox" associated with the enhanced telephony service offerings of the present invention.

Once the user has selected the desired mailbox, the contents are retrieved and displayed, as shown in FIG. 3. In this particular arrangement, a message log header 300 appears, indicating the number of received telephone messages, and message log 310 contains detailed information regarding each call. The subscriber can then scroll down through the messages (using a remote control) to select a particular call to retrieve. The subscriber can then use the set of message command buttons 320 to determine the appropriate option for the selected call. For example, the subscriber may select the "oldest" call to respond to first, in this case the call received at 5:20AM. By using the remote, the subscriber may "play" the message, or any of the other available options. Advantageously, by activating the "directory" button on command buttons 320, the subscriber may store the selected name and telephone number in his personal "directory" located within, for example, set top box 155. It is to be understood that the personal mailbox can be used to store various types of messages, including e-mail, faxes, video clips, as well as traditional voice messages. The various types of messages may either be stored in a single mailbox, or partitioned into separate "sub" mailboxes, one for each type of message.

Figure 4A:
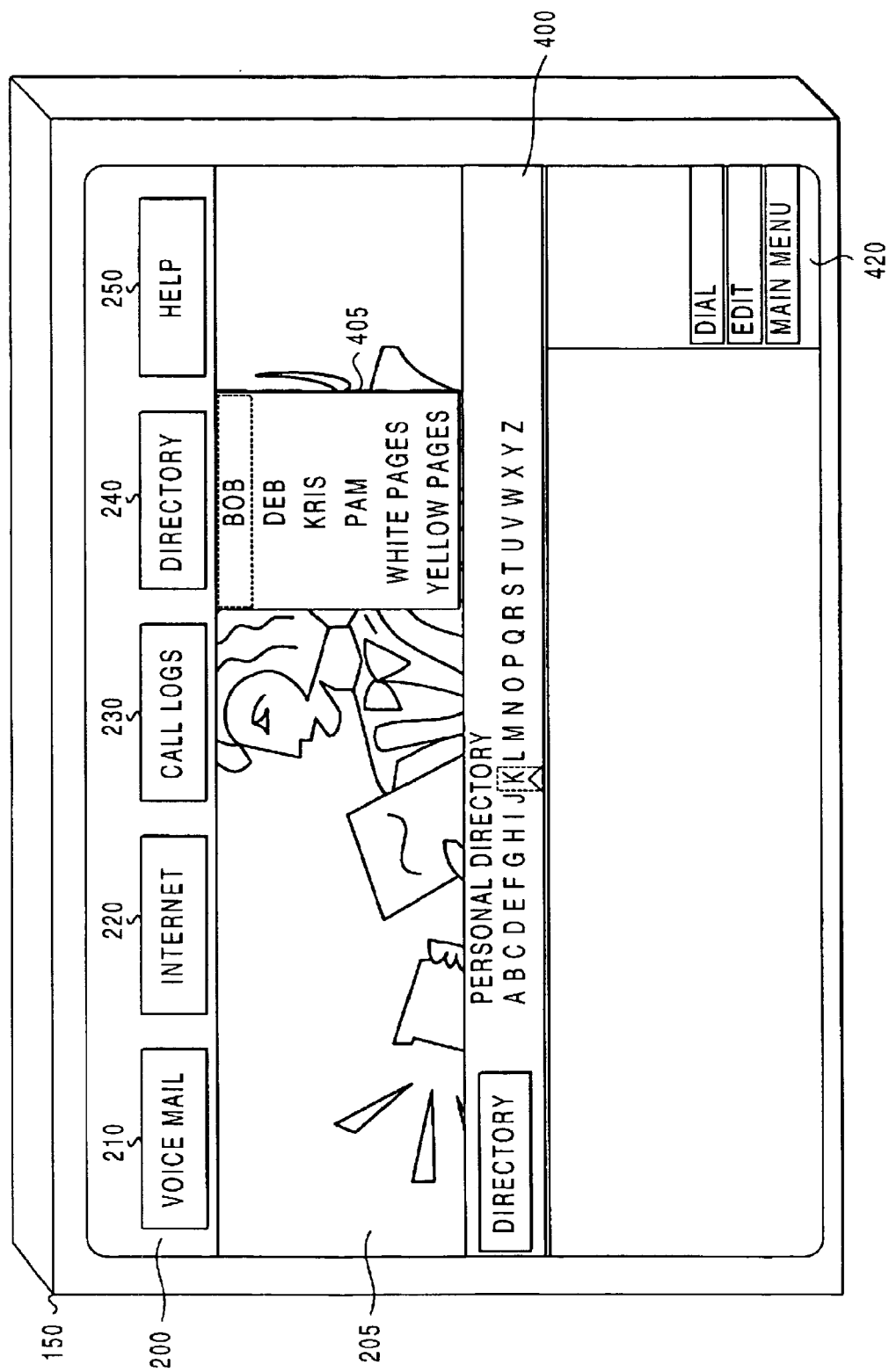
FIGS. 4A–4D illustrate in particular various options associated with a local (personal) telephone directory associated with the enhanced telephony service offerings of the present invention.
Figure 4B:
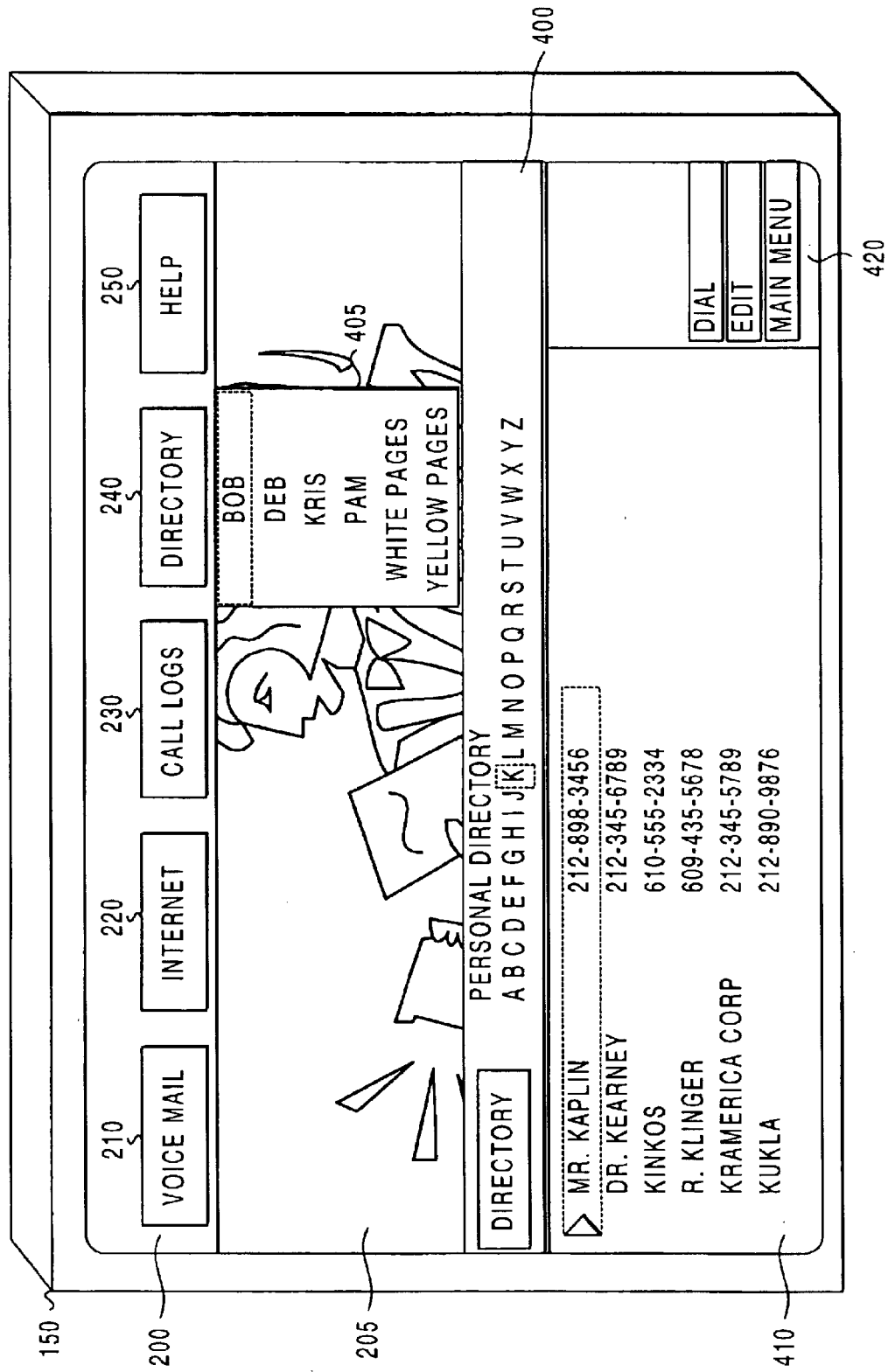

Referring to FIG. 4A, a personal directory can be entered, in accordance with the management system of the present invention, by the activation of "directory" button 240 on menu 200. Pull-down menu 405 associated with directory 240 illustrates four separate personal directories, each associated with a different individual subscriber within the residence. Advantageously, the enhanced telephony services of the present invention also provides a "white pages" directory link and a "yellow pages" directory link, as will be discussed below. In the presentation as shown in FIG. 4A, a personal directory (for "Bob") has been selected, causing a directory header 400 to appear. The subscriber can then scroll through the alphabet (using a remote control, for example) until the desired letter is reached (in this case, "k"). Once a letter is selected, then the personal directory for that letter will appear, as shown in FIG. 4B. Directory listing 410 can then be scrolled through in a similar manner until the desired number is selected. Once selected, directory command buttons 420 can be used to either place an outgoing call to the selected number, edit the directory entry, or return the enhanced telephony services to the "main" screen. Presuming that the "dial" button has been activated, set top box 155 transmits the call request through CG 140, which then ultimately sends the request upstream, via CMTS 105 to PSTN 115.

Figure 4C:
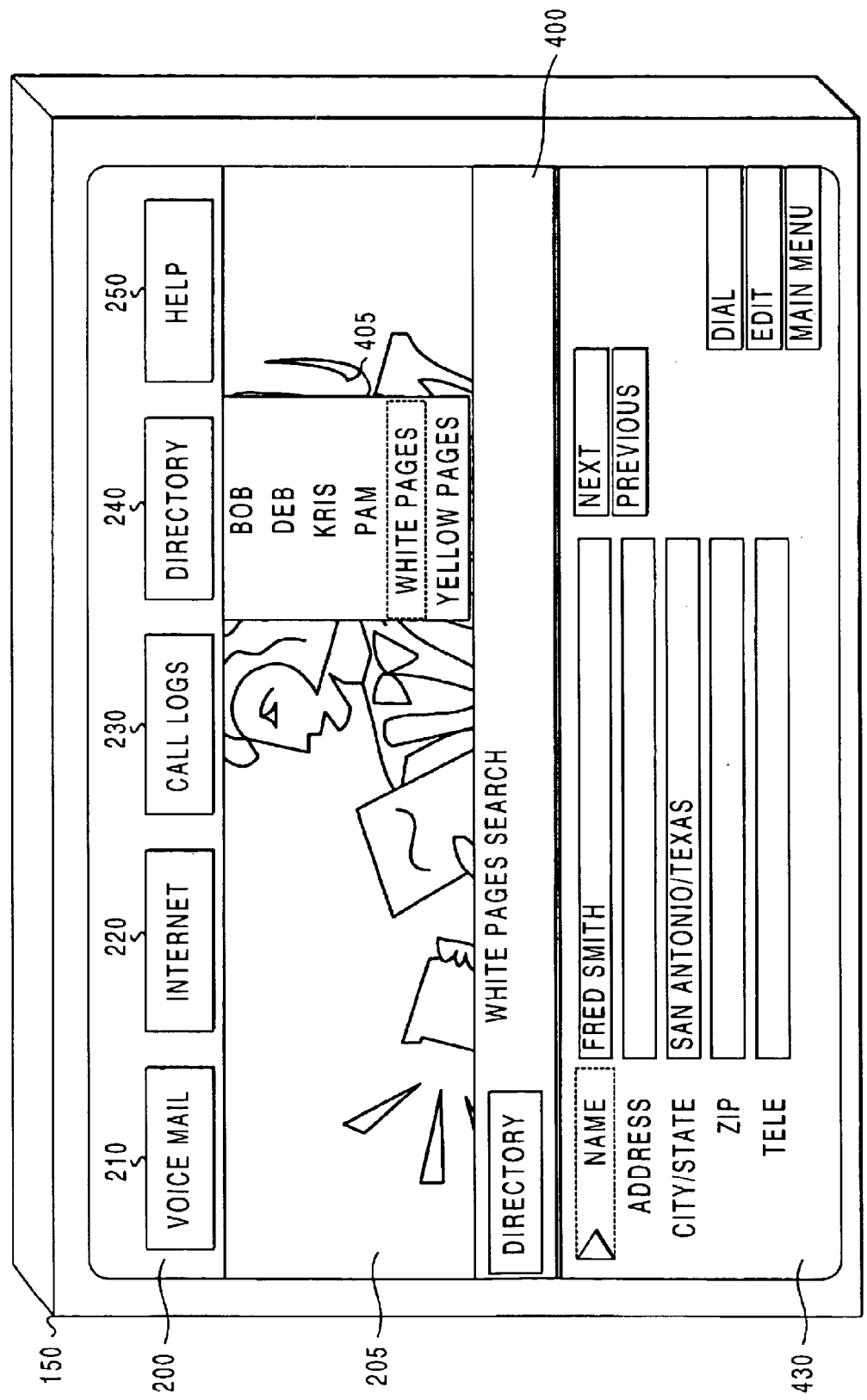
Figure 4D:
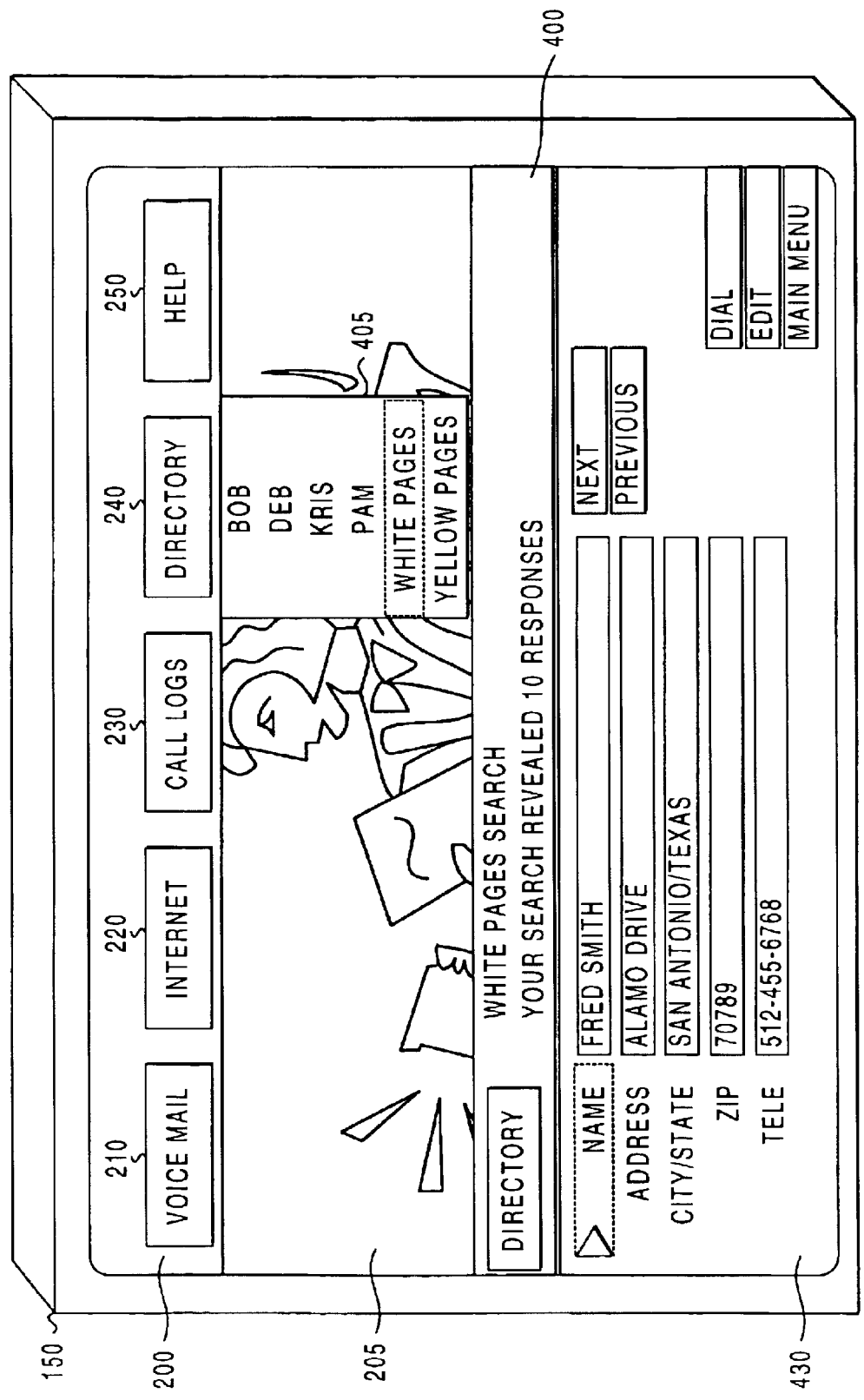

FIG. 4C illustrates an exemplary video screen associated with the activation of the "white pages" option under directory pull-down menu 405. As shown, a white pages screen 430 is presented, where the subscriber can then fill in as many fields as possible to aid in the search. The subscriber may use a keyboard, alphanumeric keys on a remote control, or any other suitable interface device, to fill in fields as shown. Once the known information is entered, a query can be launched by, for example, activating white pages directory header 400. Depending upon the system configuration, the search may be a "local" search, reserved to looking through all entries in the subscriber's personal directory included within set top box 155. Advantageously, however, the query can be launched back through the communications network to a directory service resident at, for example, head end 100. FIG. 4D illustrates the results of the search, with header 400 indicating that 10 entries have been found that match the search criteria. Directory command buttons 420 can then be used, for example, to dial the first retrieved number or continue (using the "next" and "previous" buttons) to page through the search results.

Figure 5A:
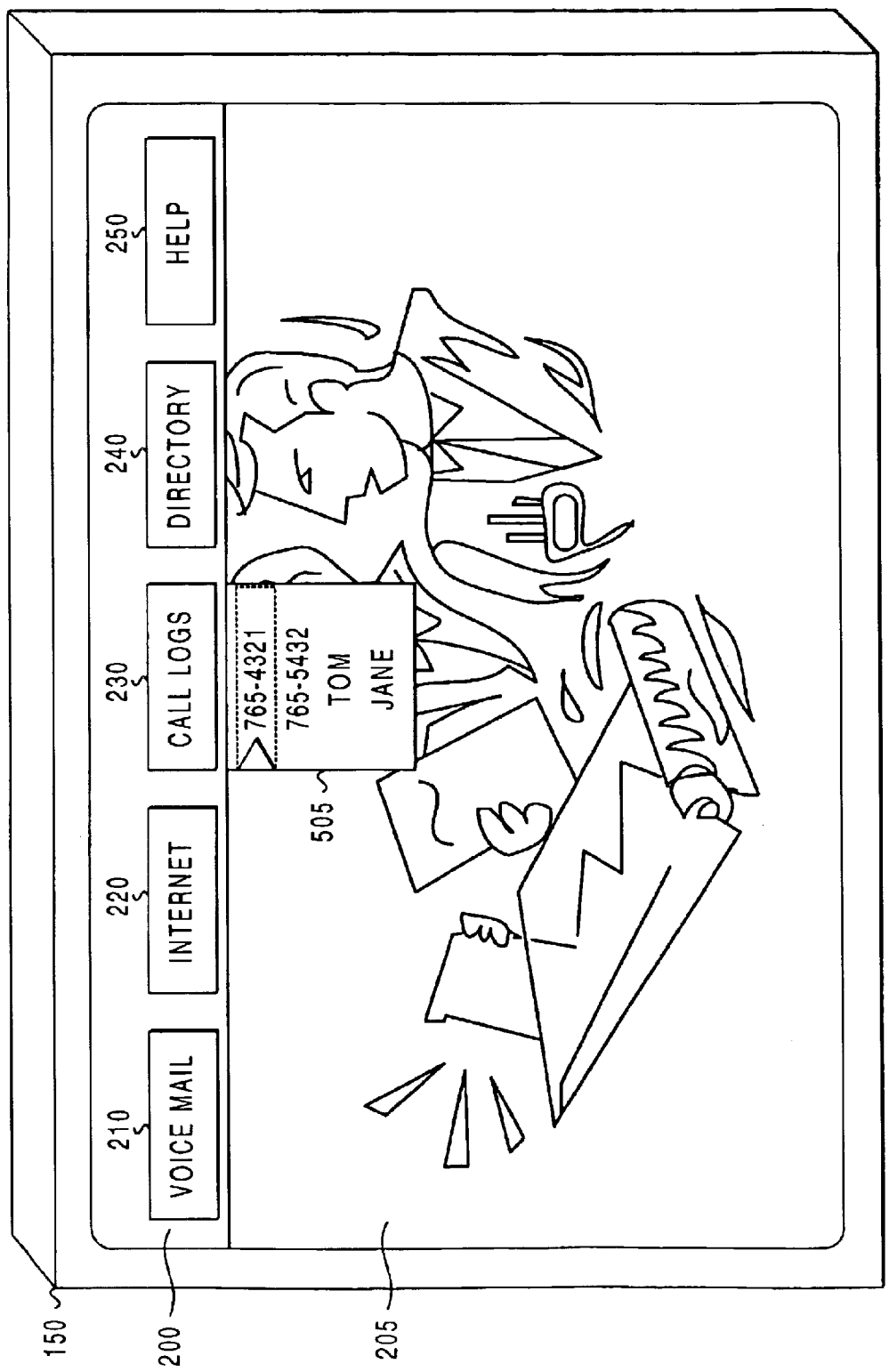
FIGS. 5A–5C illustrate in particular various call history ("call logs") data elements stored within a local database associated with the enhanced telephony service offerings of the present invention.
Figure 5B:
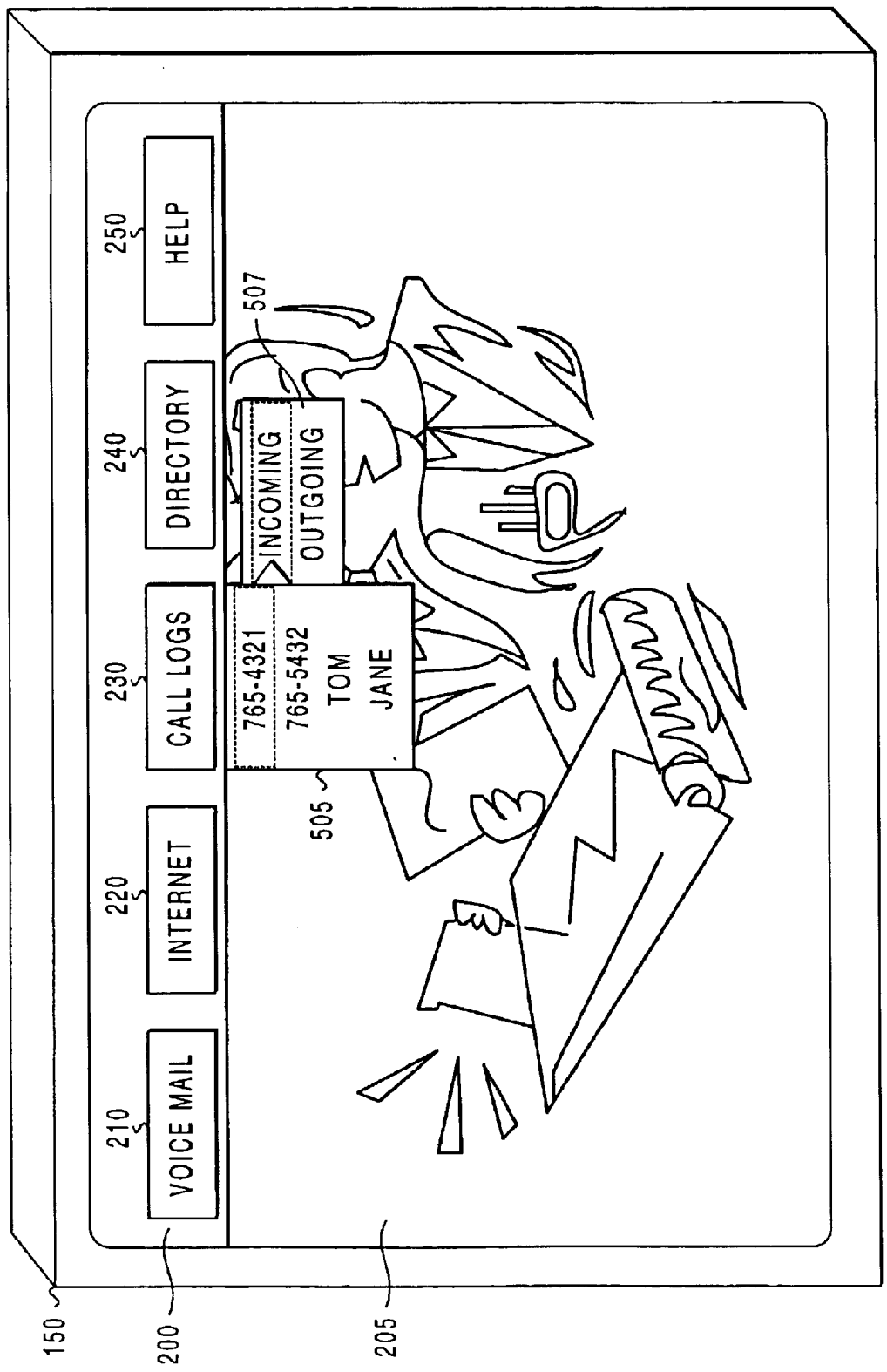
Figure 5C:
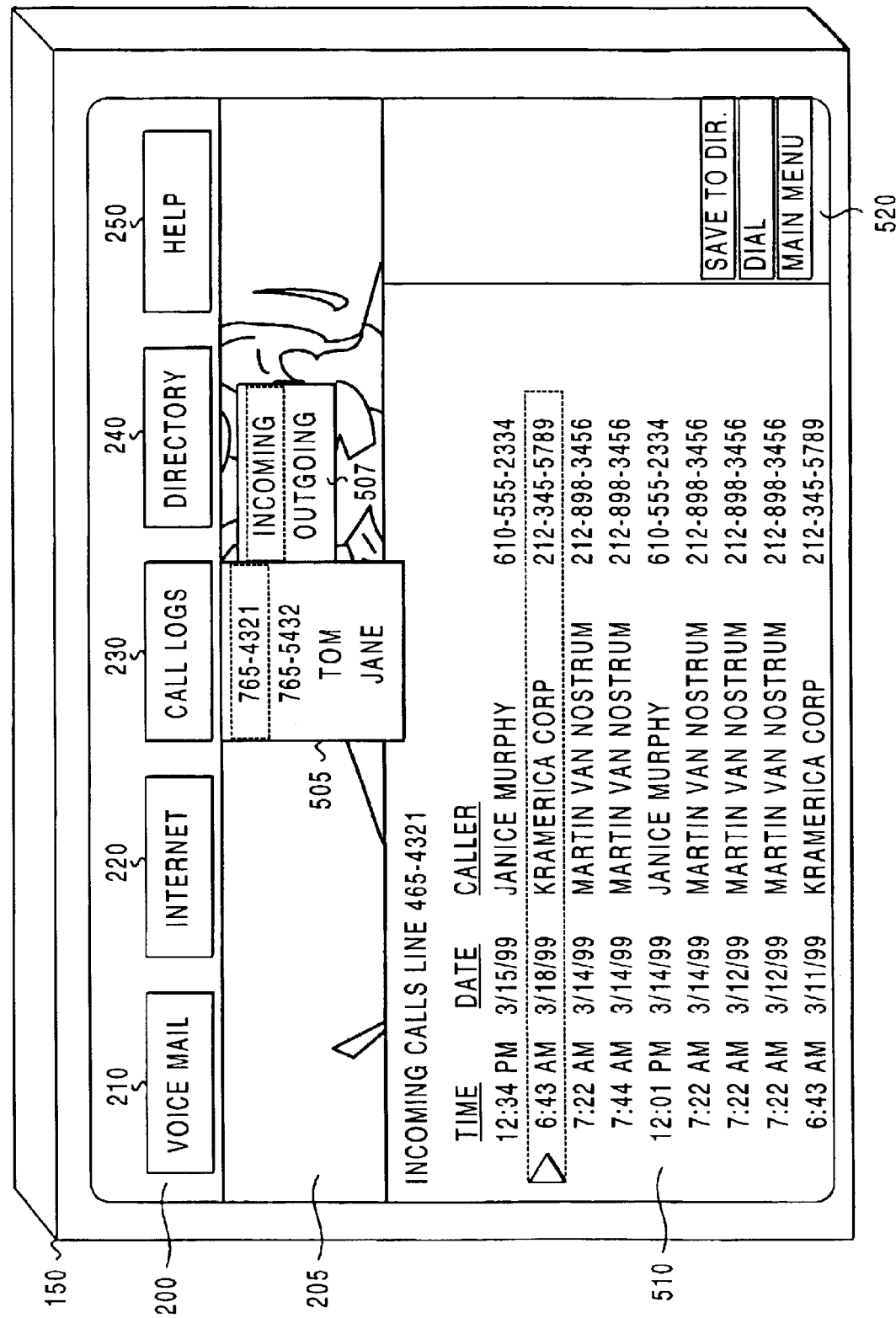

Another enhanced telephony service that can be offered in the system of the present invention is that of a "call log". Referring to FIG. 5A, a subscriber may use call log command button 230 to bring up the call log pull-down menu 505. As with every other service, it is to be understood that the television program (or other video service) will continue to proceed uninterrupted by any of the accessed enhanced telephony services. Call log pull-down menu 505 illustrates four different entries associated with the residence. In this case, there are two separate telephone lines, identified by their line numbers, as well as two individual subscribers (identified by their names). As with the other services, a remote control (or any other suitable interface device) can be used to scroll through pull-down menu 505 and select the desired entry. In this case, the first telephone number on menu 505 is selected. FIG. 5B illustrates the next step in the call log process—a listing 507 of the options associated with the "call log" (either an "incoming" call log, or an "outgoing" call log). In this case, the "incoming" call log option is selected. A log history 510 of incoming calls to the selected line is shown on FIG. 5C (where the video presentation continues to run in the background). The listing, having been stored within set top box 155, may be programmed to maintain a 24-hour call log, 48-hour, or any other desired time period, dependent upon the memory available within step top box 155 to store the information. A set of command buttons 520 associated with call log 510 allows the subscriber a number of different options, including storing a selected calling party in the subscriber's personal directory (discussed above), or initiating an out-going call to a selected calling party. In some cases, the log history itself provides useful information to the subscriber.

Figure 6A:
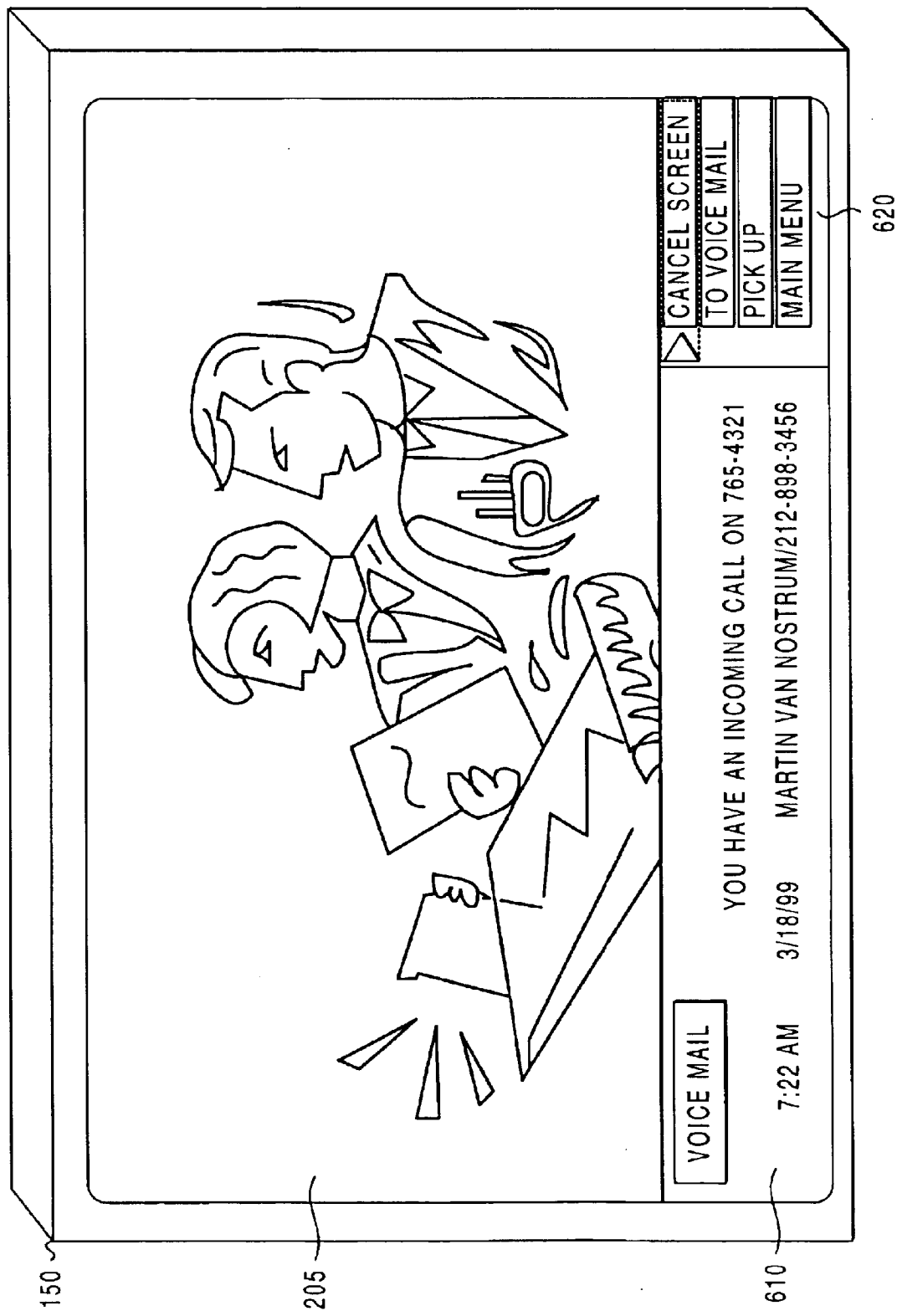
FIGS. 6A and 6B illustrate voice mail activation, as displayed on a television monitor, in accordance with the enhanced telephony services of the present invention.
Figure 6B:
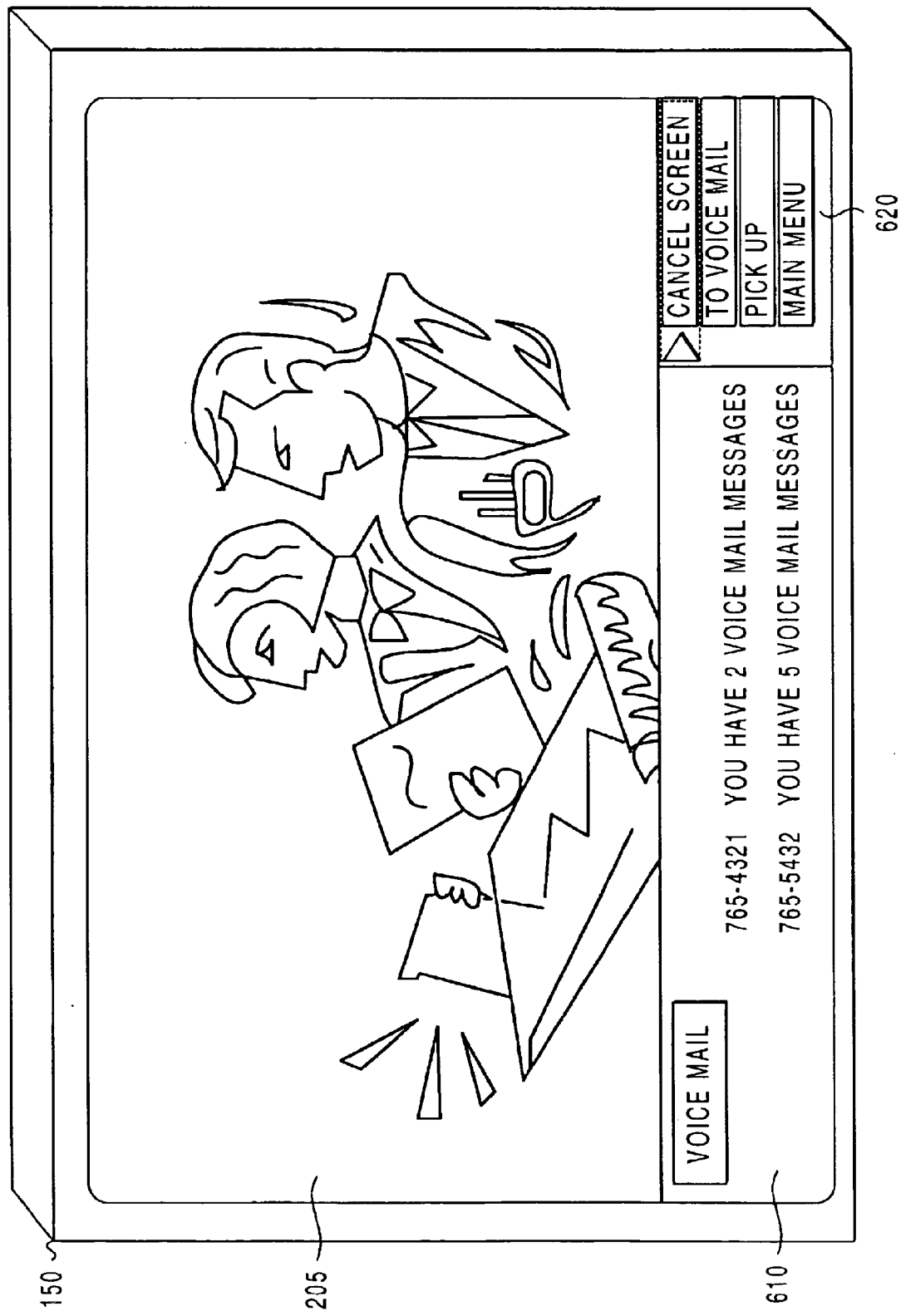

In an alternative mode of the present invention, the enhanced telephony services manager can be used to notify a subscriber of "events", such as an incoming telephone call, while the subscriber is viewing a television program or is otherwise in communication with head end 100. Referring to FIG. 6A, an event notifier screen 610 appears across the bottom of the display, in this case indicating an incoming voice call. Command buttons 620 can then be used to ignore the call, send the call to voice mail, or answer the call. FIG. 6B illustrates an event notifier display 630 indicating the number of voice mail messages stored with each telephone line in the residence. It is to be understood that various other events may be displayed, such as receipt of e-mail, faxes, or any other type of incoming message.

Figure 7:
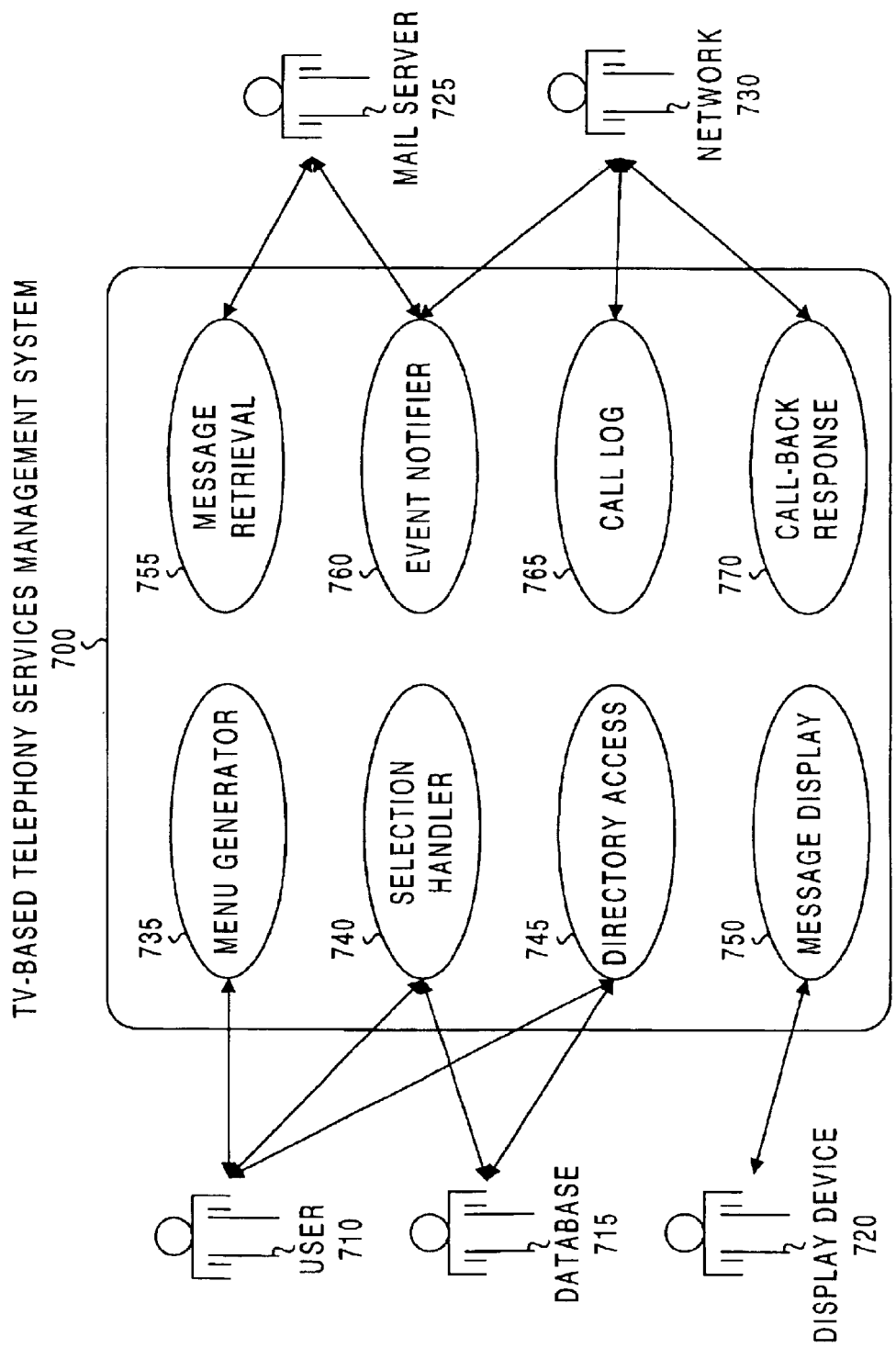
FIG. 7 is a use case diagram of an exemplary telephony services management system for implementing the service offerings of the present invention.

The following figures describing the operation of the present invention are based on the use of Unified Modeling Language (UML). UML provides a standard for describing systems and software and allows for efficient implementation of those systems. UML diagrams consist of, for example, "use case" (also referred to as "context") diagrams that describe the context and one or more embodiments in which a system operations. FIGS. 7–9 illustrate exemplary "use case" diagrams. In accordance with the UML terminology, use case diagrams include elements that are external (e.g., "external actors") and internal (e.g., "internal" use cases) to the system, and which serve to describe the system itself, its functionality (defined by the use cases), and its interaction within the system (i.e., with the external actors). In general, use cases describe a particular functionality which the system must perform, such functionality being invoked by one or more of the external actors.

Static class diagrams, as represented below in FIGS. 10–15, are another type of diagram also used in UML. The "classes" represent abstractions of "objects" that are the element and integral components of the system, and which interact to effect the functionality and requirements of the system. In the context of software, objects frequently refer to software objects utilized in an object-oriented programming language, such as C++, Java, or the like. UML is also used to describe systems outside the context of software, in which case an "object" is a general description for an elemental subcomponent of the system, and can comprise software, hardware, or a combination of both. UML thus provides the ability to model a system and allow for rapid implementation.

Although as depicted in the following figures, the system of the present invention is described in UML (and at times with reference to object-oriented programming), it is to be understood that the enhanced telephony services management system can alternatively be represented through procedural diagrams including flowcharts and block diagrams, and can be implemented using a number of procedural languages including, but not limited to, C, Pascal, Fortran, and Basic.

Referring, then, to the drawings, FIG. 7 illustrates a use case diagram 700 for an exemplary enhanced telephony services management system used to implement the various features as discussed above. Within an exemplary residence are included a set of external actors for interacting with use case 700, such as a user 710, a local database 715, and a display device 720. These external actors interact, via management system use case 700, with a second set of external actors, including a network mail server 725 and a communications network 730. As shown, user 710 is capable of activating the enhanced services telephony menu, as indicated by "generate menu" use case 735 within management system use case 700. Various ones of the services menus and pull-down menus have been discussed above in association with the various enhanced services offered by the system of the present invention. User 710 also interacts with a selection handling use case 740 and an "access directory" use case 745 to provide the desired services. In particular, selection handling use case 740 allows user 710 to "scroll" through various options in any selected pull-down menu (as discussed above) and "select" a particular item to activate. Access directory use case 745 allows user 710 to enter a designated local directory (stored within set top box 155, for example) upon confirmation that the user has permission to access that directory (by entry of a predefined password or ID code). Additionally, information may be transmitted between local database external actor 715 and both selection handling use case 740 and access directory use case 745. Various messages, stored via a "display message" use case 750 can then be presented on display device 720, as shown. On the network side of management system use case 700, mail server external actor 725 interacts with both a "retrieve message" use case 755 and "event notifying" use case 760 in order to provide the mail information (e.g., voice, e-mail, fax, video, etc.) to user 710. Network 730 similarly interacts with event notifying use case 760, as well as "log call" use case 765 and call-back responding use case 770.

Figure 8A:
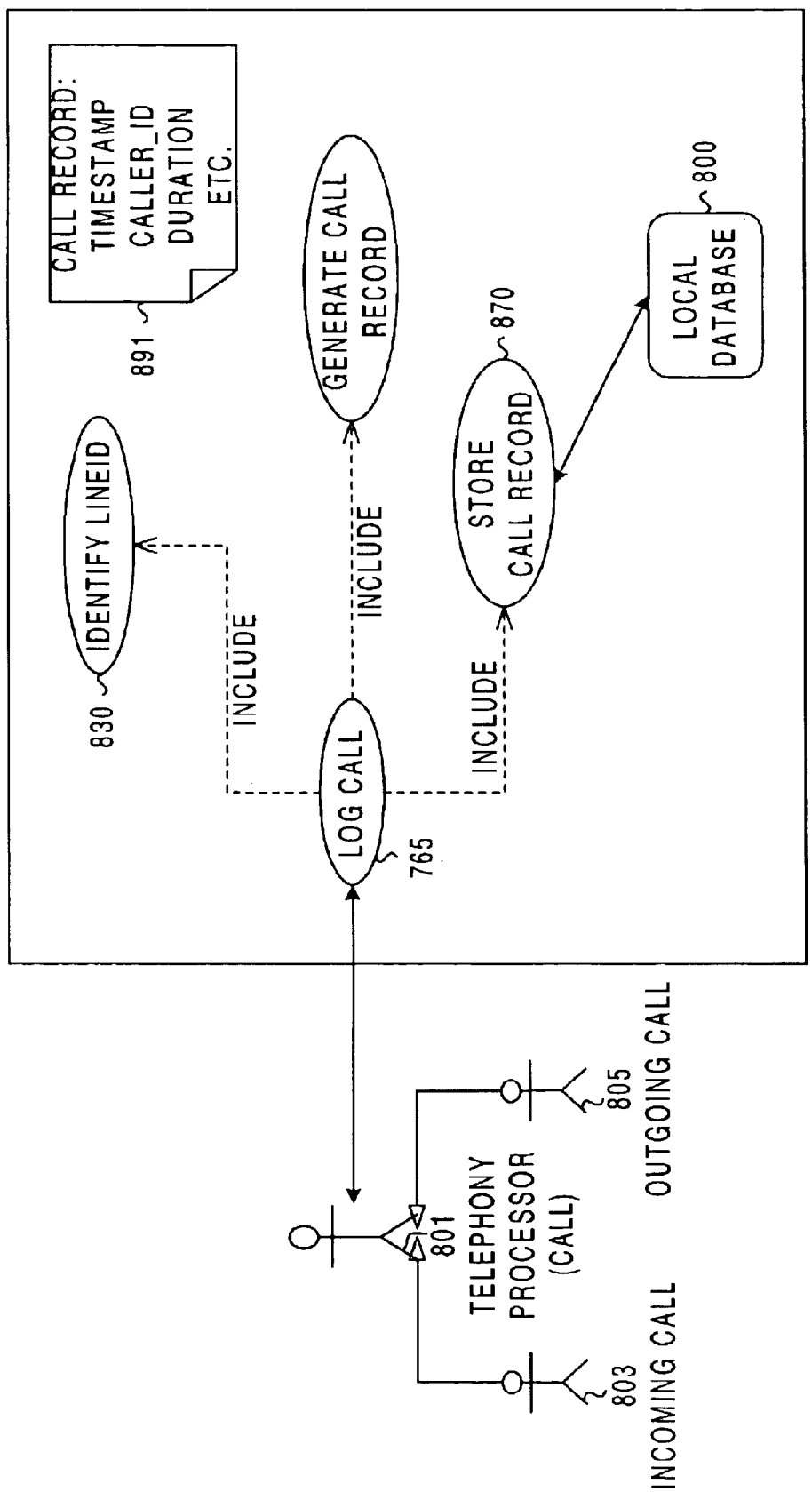
FIG. 8A contains an exemplary use case diagram associated with voice call treatment options within the enhanced services environment of the present invention.
Figure 9:
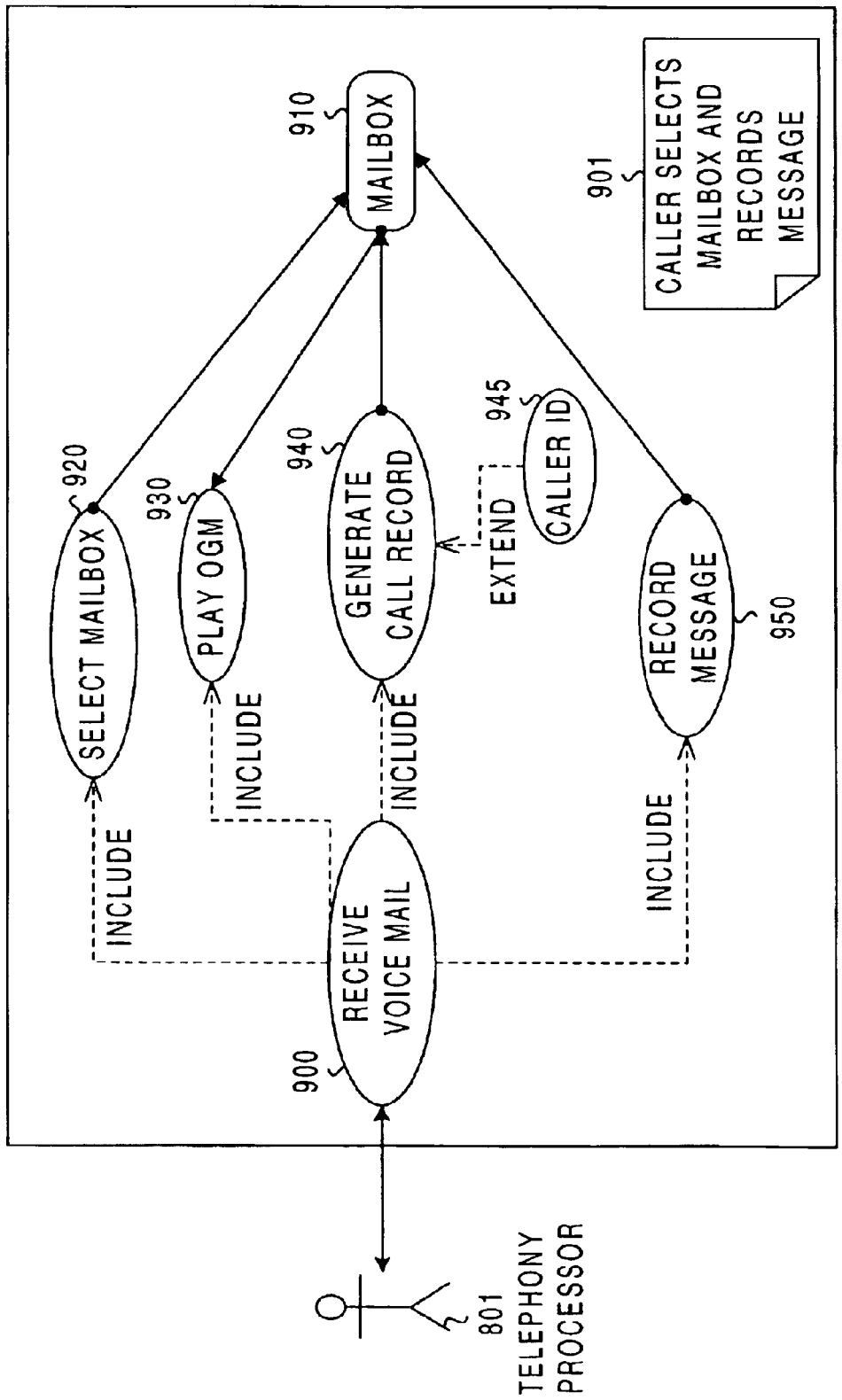
FIG. 9 contains an exemplary use case diagram associated with voice mail processing in accordance with the present invention.

FIG. 8A illustrates, in more detail, an exemplary use case diagram for creating a call log entry for storage within a local database 800. A telephony processor external actor 801 is used to interface with either an incoming call actor 803 or outgoing call actor 805 to strip off the necessary information to create the call log entry. Log call use case 765 (see FIG. 7) is then activated and the following actions are performed: 1) identifying the line number ("line id" use case 830) associated with the incoming/outgoing call; 2) generating an associated call record ("generate call record" use case 850); and 3) storing the call record data ("store call record data" use case 870). When the user later requests a "call log" history, local database 800 can access the stored call records in block 870 and display the desired information. Comment region 891 in use case diagram 765 of FIG. 8A illustrates some of the particular information that can be stored in a local database and used as part of the call record.

Figure 8B:
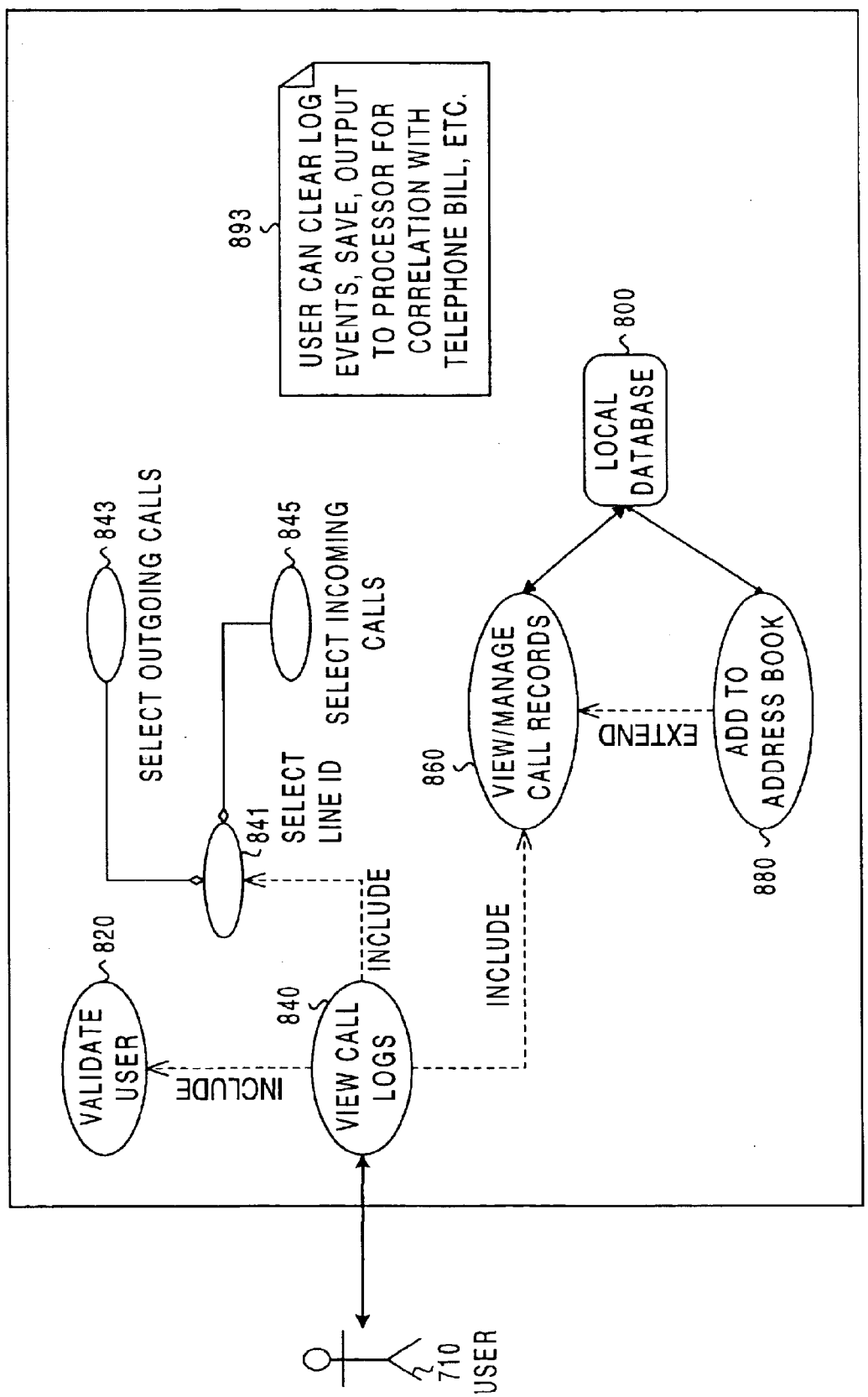
FIG. 8B contains an exemplary use case diagram illustrating a user interaction with the call treatment process of the present invention.

A use case diagram illustrating the interaction between a user/external actor 710 and the "view call log" use case 840 is shown in FIG. 8B. Upon activating the call log button 230 on menu 200 (see FIG. 5A), user 710 can then view the call logs ("view call log" use case 840), where such viewing may require user 710 to enter a password for validation ("validate user" use case 820). Once user 710 is validated (if necessary), a line id is selected ("select line ID" use case 841), where the line id may include both line numbers and "names" or other line id descriptors, as discussed above with reference to FIG. 5. Upon selection of a particular id, user 710 next accesses either "outgoing" calls use case 843 or "incoming" calls use case 845. User 710 then views call records ("view call record" use case 8640), where local database 800 is used to generate the proper information as requested by user 710. As discussed above, user 710 may select to have an identified call record added to his local directory, indicated by "add to address book' use case 880 in FIG. 8B, where use case 880 interacts with local database 800 to store the desired entry.

Voice mail retrieval in accordance with the present invention is further exemplified in the use case diagram of FIG. 9. As shown, telephony processor/external actor 801 initiates the process with a "receive" voice mail use case 900. Presuming the system includes multiple mailboxes (e.g., a separate mailbox for each resident), the proper mailbox is selected ("select mailbox" use case 920). A message requesting the calling party to record a voice mail message is then played ("play OGM" use case 930) and a call record is generated ("general call record" use case 940), including the line id and, if available, caller id information ("caller ID" use case 945). The calling party then records a message ("record message" use case 950), with all of this information stored in the proper mailbox 910.

Figure 10A:
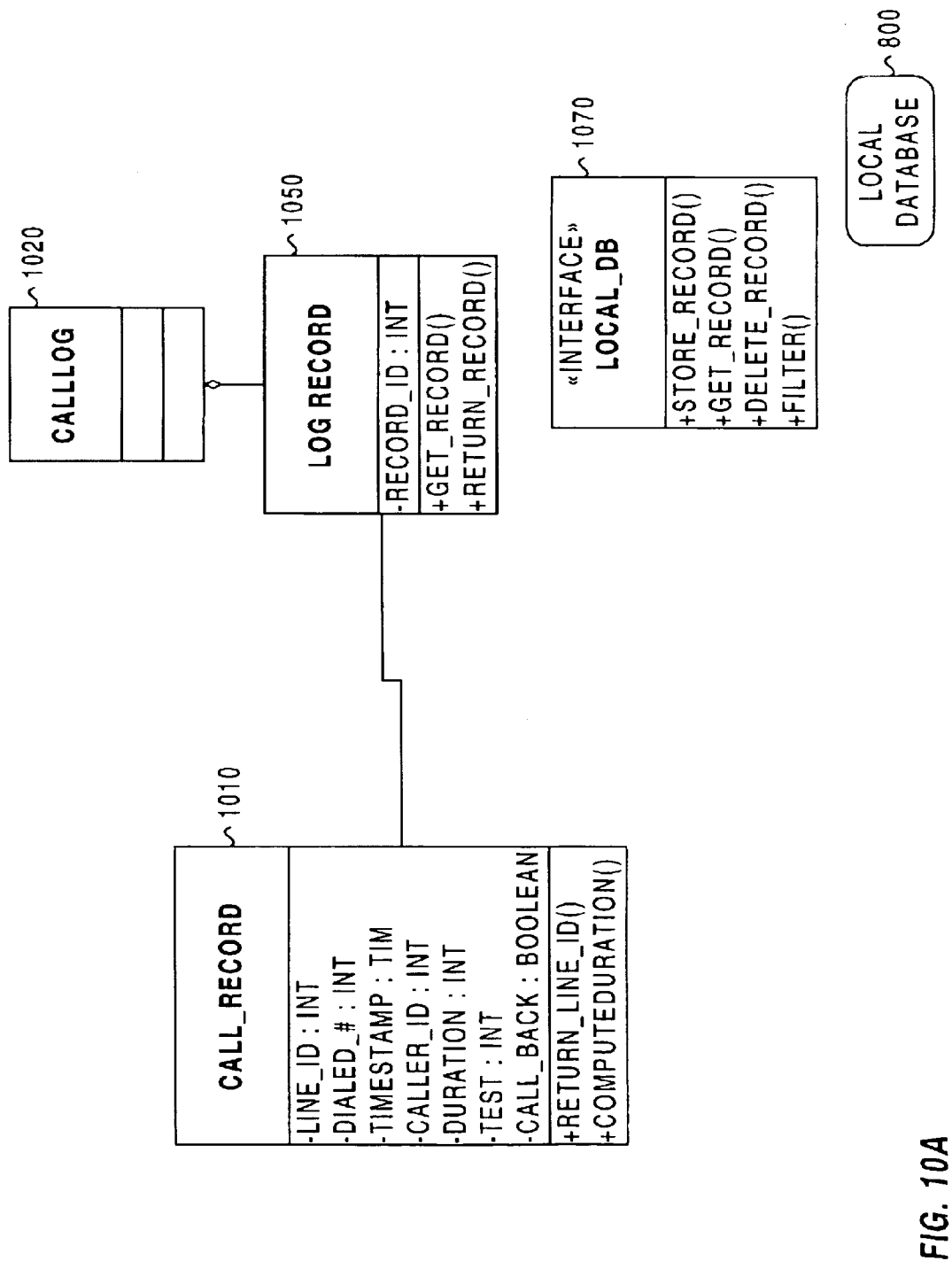
FIGS. 10A and 10B illustrate exemplary "call log" static class diagrams associated with the enhanced telephony service offerings of the present invention.
Figure 10B:
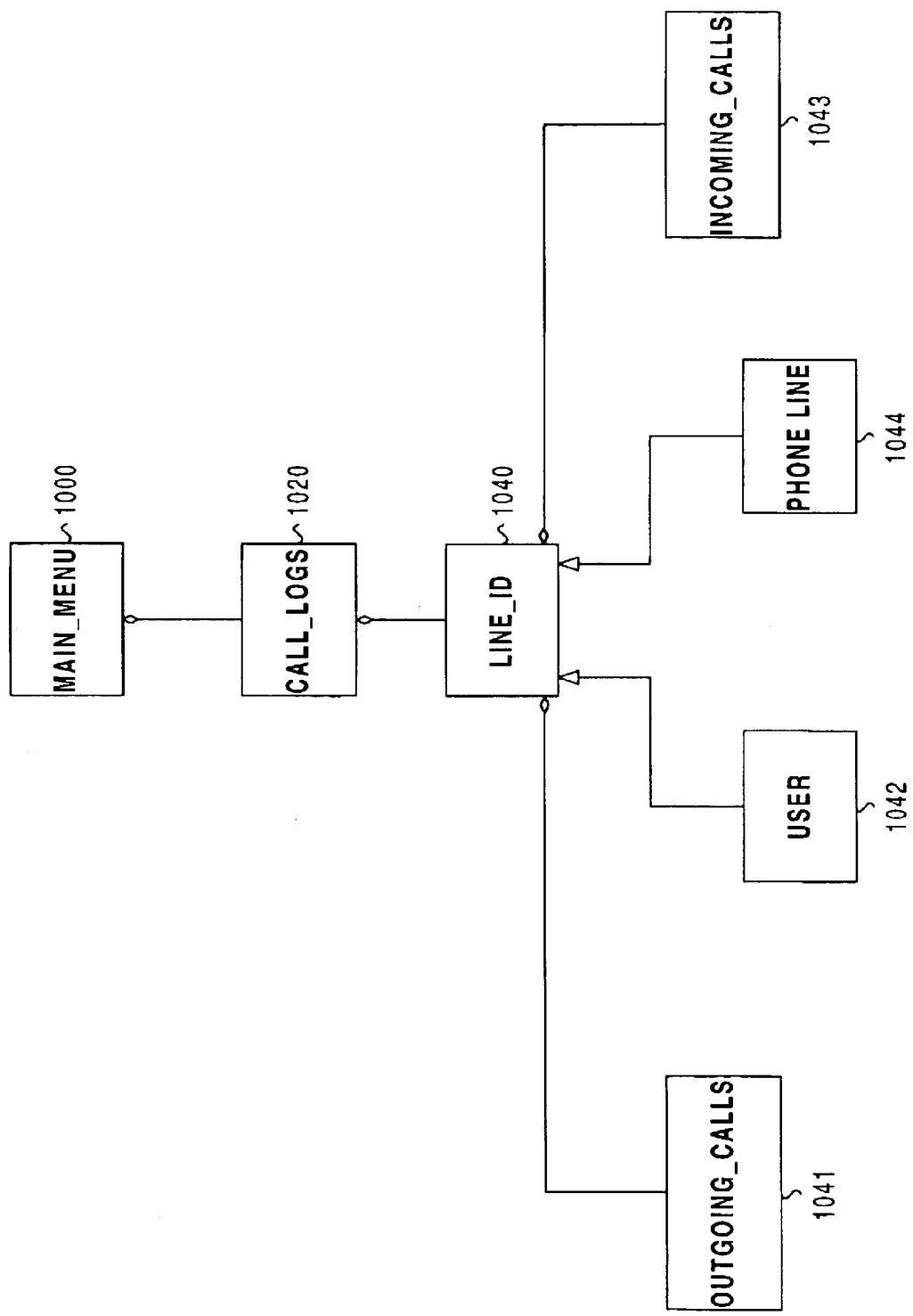

Call log class diagrams further describing an exemplary process for logging all incoming calls is illustrated in FIGS. 10A and 10B. Within call log class 1020 of FIG. 10A is a plurality of separate call record classes 1010, where a single call record class 1010 is illustrated in FIG. 10A. Various attributes associated with creating a call log are shown in class 1010, including the line id for the incoming call, the dialed number (line id) associated with the particular called number, the time of the call, etc. Once a call record class 1010 is created (forming, when populated, an "object"), the record is logged, as shown in class 1050, and assigned a log number within call log class 1020. The process used to control the call log process is illustrated in interface 1070, which interacts with local database 800. As shown in interface 1070, the various functions associated with call logging include: storing a created record 1010, retrieving a record stored in a call log object 1020, deleting a selected record, and filtering all stored records using a predetermined criteria (i.e., all calls received from a certain calling party).

A static class diagram associated with the call logging process is illustrated in FIG. 10B, which begins with a main menu class 1000, under which call log class 1020 can be selected. Upon selection of a predetermined line id class 1040, user 1042 can chose to interact with either outgoing calls class 1041 or incoming calls class 1043, where phone line class 1044 is also coupled to line id class 1040 and used to supply the necessary line information to line id class 1040.

Figure 11:
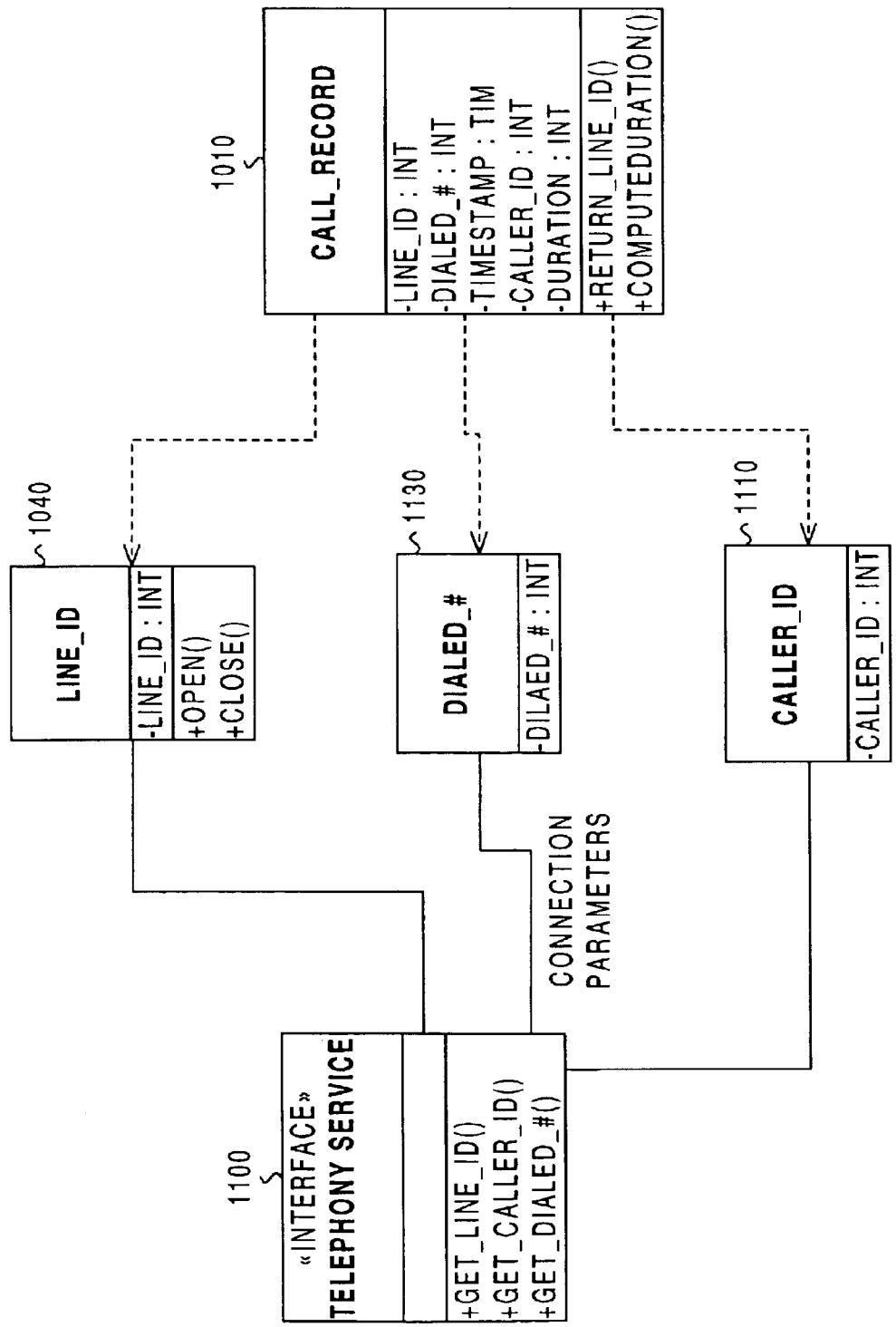
FIG. 11 illustrates an exemplary "call record" class diagram.

FIG. 11 illustrates an exemplary call record class diagram useful in discussing the enhanced telephony service offerings of the present invention, illustrating in particular the relationship between call record class 1010 (as discussed in association with FIG. 10A), line id class 1040 (as discussed in association with FIG. 10B), and various telephony service classes. As shown, a telephony service interface 1100 is used to retrieve the desired information from the proper objects within the associated classes. In particular, telephony service interface 1100 first functions to retrieve the line id ("get line id") from line id class 1040, then retrieves caller id information ("get caller id"), if available, from class 1110. The dialed number information ("get dialed #") is retrieved from dialed number class 1130, where all of these parameters are stored in call record class 1010.

Figure 12A:
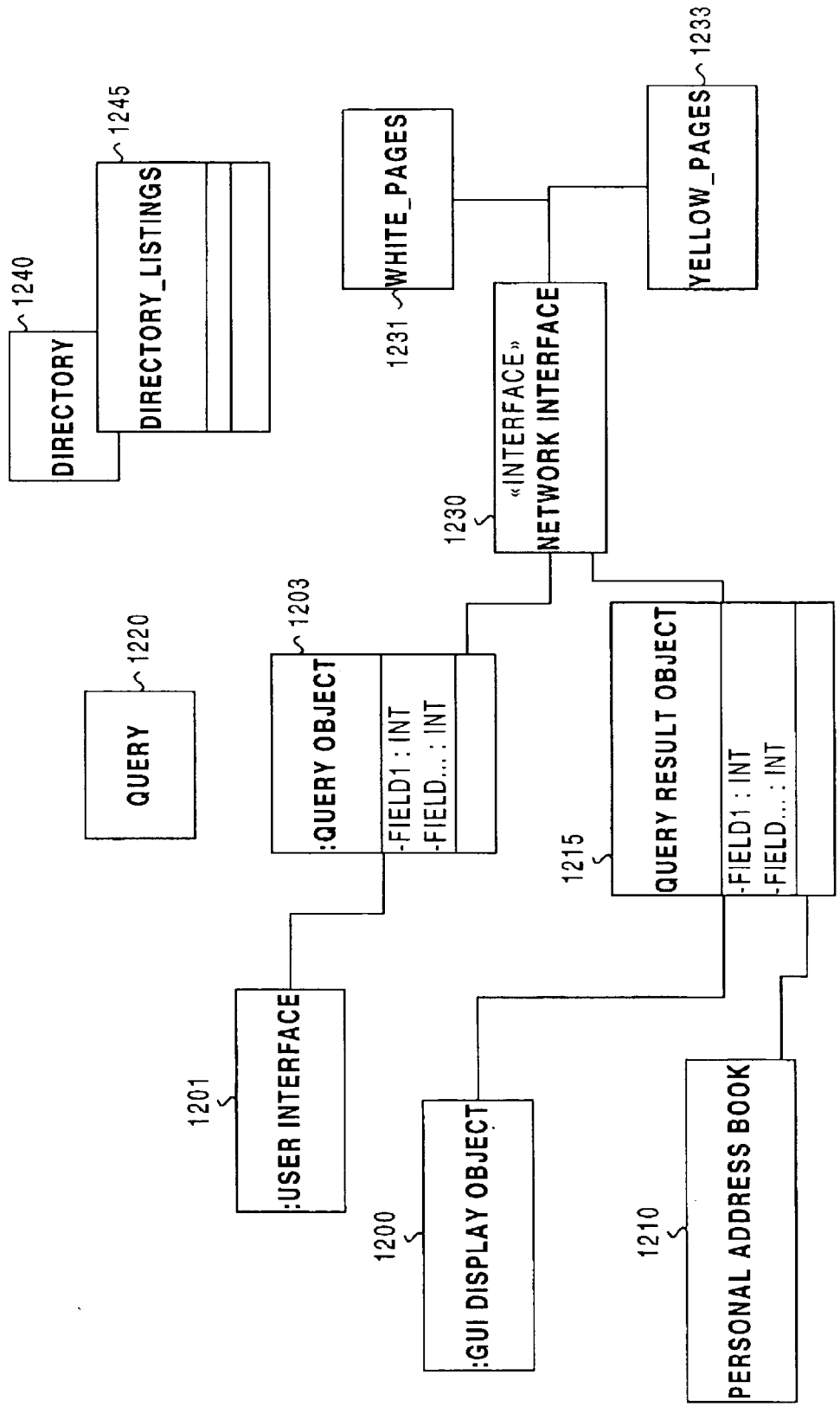
FIGS. 12A and 12B illustrate exemplary "directory service" class diagrams associated with the enhanced telephony service offerings of the present invention.
Figure 12B:
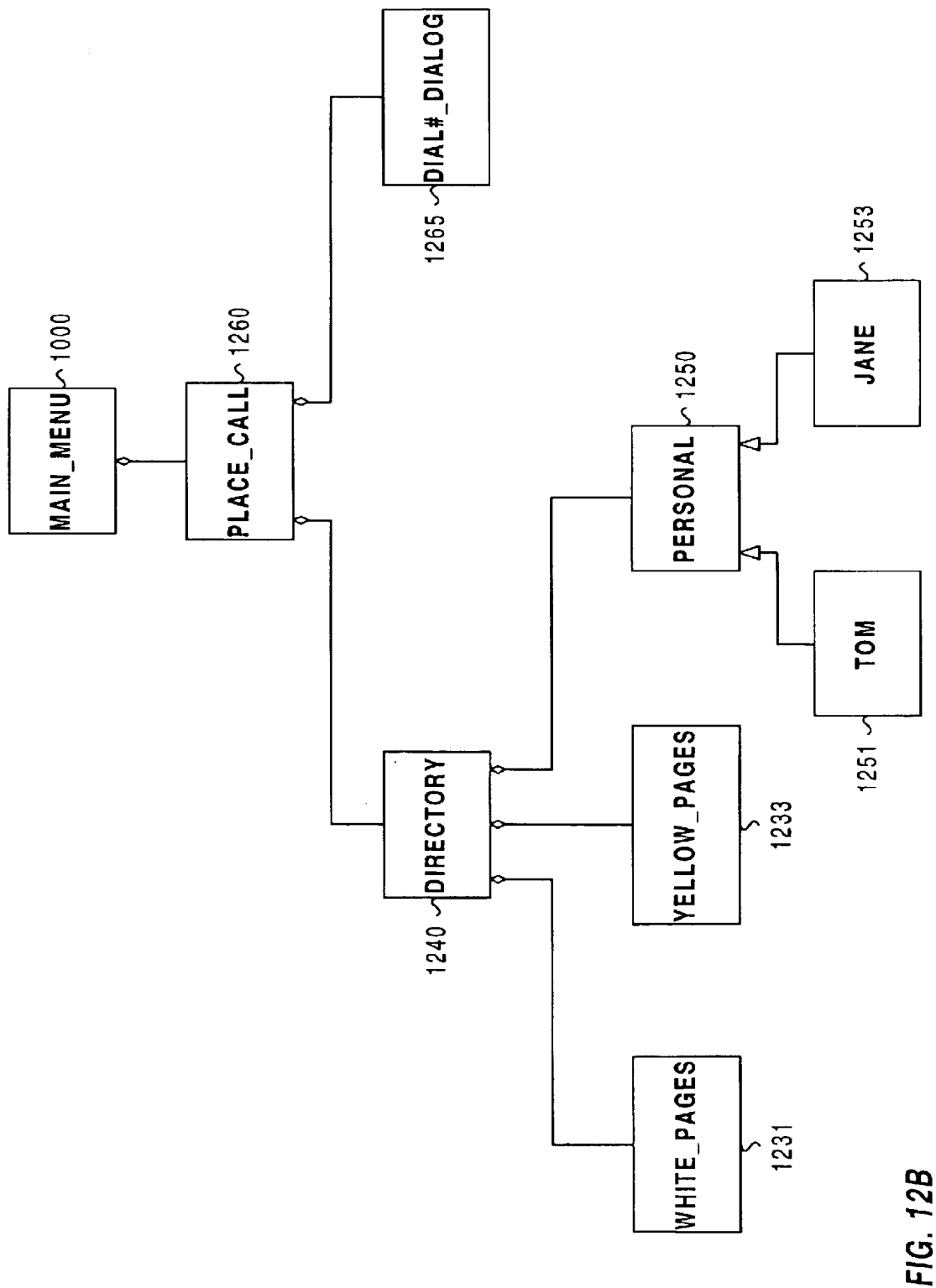

The directory service option of the enhanced telephony services of the present invention may be understood by reference to the class diagrams of FIGS. 12A and 12B. Directory service is launched with a query (block 1220), as discussed above in association with FIG. 4A. An exemplary user interface 1201 (such as a remote control or a keypad) is used to first initiate the query, then interact with the results. A television screen or other graphical user interface (GUI) 1200 is used to display the directory search results, as discussed above. An exemplary query object is illustrated in block 1203 and may include one or more fields of information to be used to conduct a search. For example, last name information, coupled with city/state information may be used to conduct a search. Alternatively, an alphabet search may be used in conjunction with a personal address book 1210, where personal address book 1210 is resident locally with the user (in set top box 155, for example). The results of the query, indicated in query result object 1215, are then displayed on GUI object display 1200. Depending on the type of search to be performed, the query may be launched through a network interface 1230 to either a network-based white pages class 1231 or yellow pages class 1233, each including a directory class 1240 with a listings class 1245. As with the local search, the results from searching white pages class 1231 and/or yellow pages class 1233 are returned to the query result object 1215 for display on GUI display object 1200.

FIG. 12B illustrates an exemplary static class diagram useful with the directory process, which begins at main menu class 1000 (used for all enhanced telephony services of the present invention), and is initiated by attempting to place a call ("place call" class 1260). If the number to be dialed is not known, the directory service of the present invention is initiated directory class 1240, where the user has the options of searching network white pages (class 1231), network yellow pages (class 1233), or a local, personal directory (class 1250). With personal directory class 1250, there may be subdirectories associated with different system users, illustrated as a subdirectory class 1251 for "Tom" and a subdirectory class 1253 for "Jane". As indicated by the arrows directed at class 1250 from subclasses 1251 and 1253, each subdirectory will have the same set of attributes as the larger "personal" director class 1250. Once the desired directory number has been found, the number is returned to "place call" class 1260, which forwards the number to "dial number" class 1265 to initiate the telephone call.

Figure 13:
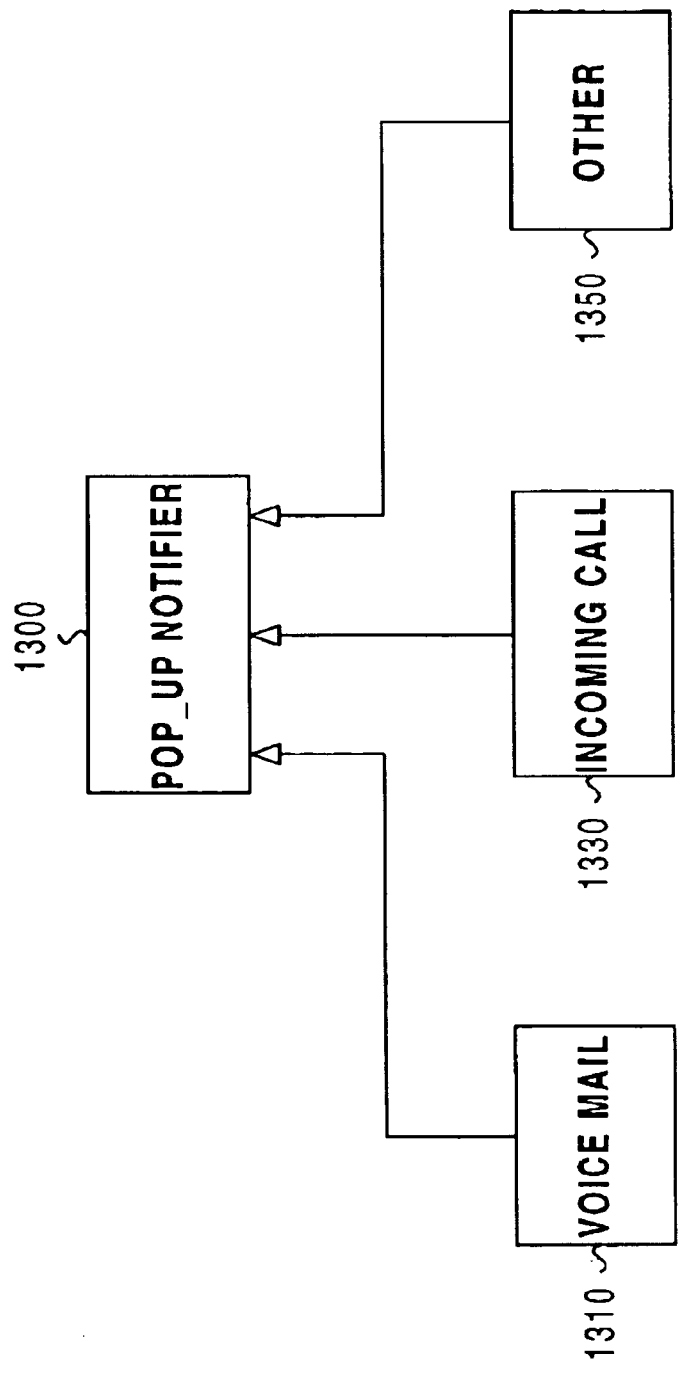
FIG. 13 contains a diagram illustrating an exemplary "event notifier" class diagram of the present invention.

As discussed above, a popup notifier may be used to present real-time information to a subscriber. For example, FIG. 6A includes a pop-up display indicating the receipt of a telephone call. FIG. 13 contains an "event notifier" class diagram illustrating this process, where a voice mail class 1310, an incoming call class 1330 and any other desired service class 1350 (such as, for example, receiving a fax transmission) are linked to a pop-up notifier class 1300. Therefore, when a new event is logged into any of the classes 1310, 1330 or 1350, a flag will be set to cause pop-up notifier to be presented on the display device, where the notifier includes the proper information as forwarded by one of the classes 1310, 1330 or 1350.

Figure 14:
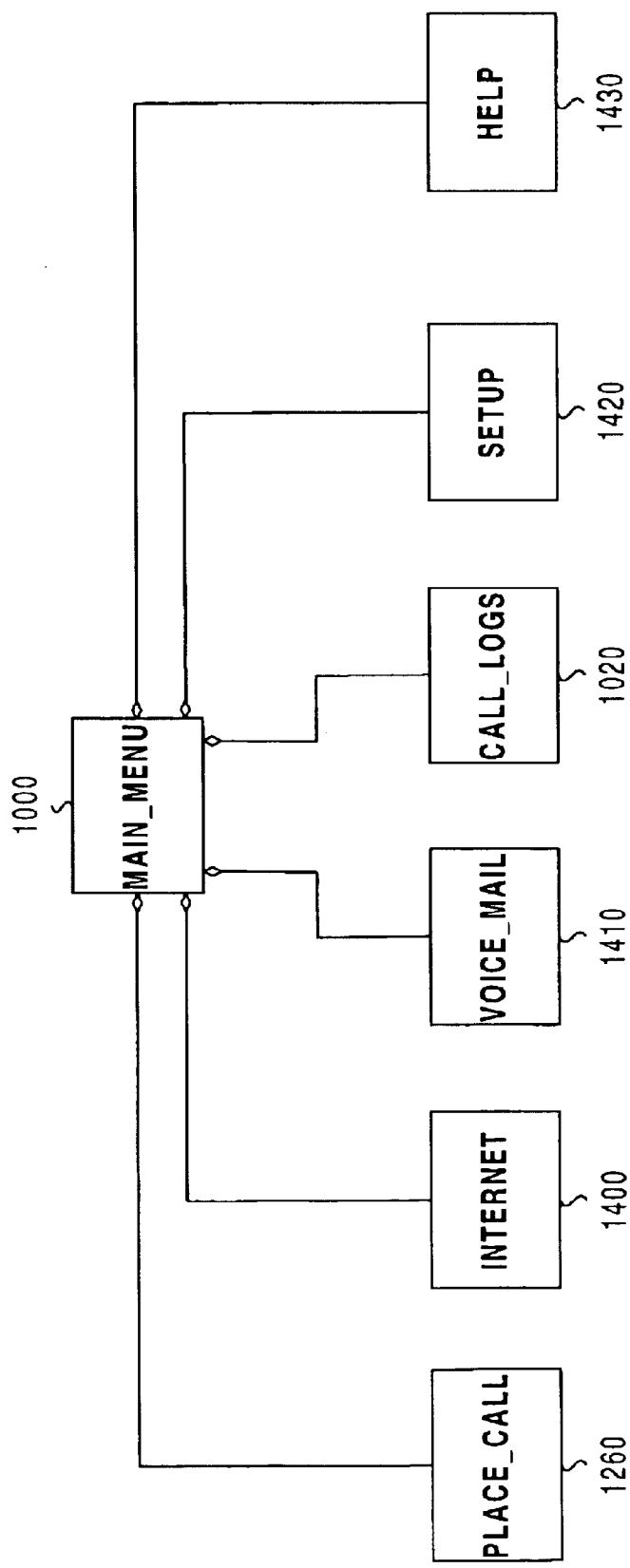
FIG. 14 contains an exemplary user menu class diagram associated with the enhanced telephony services arrangement of the present invention.

A user menu class associated with the enhanced telephony services of the present invention is shown in FIG. 14, where the user/external actor interacts with main menu 100 to access any of the following services: placing a voice call class 1260, accessing the Internet class 1400, retrieve voice mail class 1410, log call class 1020, service set-up class 1420, and "help" class 1430. Service set-up can be considered as a user-configurable mode to provide the specific service options desired by the user. The "help" option may be a local help service, within set top box 155, for explaining the operation of and access to the various enhanced telephony services of the present invention.

What is claimed is:

1. An enhanced telephony services management system for controlling communications between a subscriber location and a head end in a broadband cable television communication system, the subscriber location including a local database, a display device and an interface device for interacting with the display device, and the head end including connections to a network mail server, a conventional broadcast television source and at least one remote network database, the enhanced telephony services management system comprising a plurality of user modules for interacting with the subscriber local database, display device and interface device to initiate and control the presentation and delivery of enhanced telephone services to the subscriber through the display device while simultaneously viewing programming from the conventional broadcast television source; and a plurality of network modulates for interacting with the network mail server and the head end in the broadband cable television communication system to provide the enhanced telephone services to the subscriber.

2. An enhanced telephony services management system as defined in claim 1 wherein the plurality of user modules comprises a menu generation module for creating selected enhanced telephony services menus in response to commands from a subscriber;

a selection handler module, responsive to commands from the interface device, to control the selection of options listed with selected menus and pull-down menus; and a message display module for creating menu displays in response to the menu generation module and communicating the created displays to the subscriber display device for simultaneous displaying with programming being viewed from the conventional broadcast television source.

3. An enhanced telephony services management system as defined in claim 2 wherein the plurality of user modules further comprises a directory access module for controlling a subscriber's access to a personal telephone listing directory maintained within the local database.

4. An enhanced telephony services management system as defined in claim 3 wherein the directory access module further permits access to network-based telephone directories.

5. An enhanced telephony services management system as defined in claim 4 wherein the network-based telephone directories include white pages listings.

6. An enhanced telephony services management system as defined in claim 4 wherein the network-based telephony directories include yellow pages listings.

7. An enhanced telephony services management system as defined in claim 1 wherein the plurality of network modules comprises a message retrieval module in communication with the network mail server for collecting messages destined for the user; and a call log module for storing data related to either one of incoming messages and outgoing messages.

8. An enhanced telephony services management system as defined in claim 7 wherein the plurality of network modules further comprises an event notifier for providing real time incoming message information to the user display device for simultaneous display with current programming being viewed from the conventional broadcast television source.

9. An enhanced telephony services management system as defined in claim 8 wherein the plurality of network modules further comprises a call-back module, coupled to the broadband communication system for initiating a return call in response to a received message from the event notifier.

10. An enhanced telephony services management system as defined in claim 7 wherein the retrieved mail includes voice mail messages.

11. An enhanced telephony services management system as defined in claim 7 wherein the retrieved mail includes e-mail messages.

12. An enhanced telephony services management system as defined in claim 7 wherein the retrieved mail includes fax messages.

13. An enhanced telephony services management system as defined in claim 7 wherein the retrieved mail includes video messages.

14. An enhanced telephony services management system as defined in claim 7 wherein the call log module further includes a directory access element for storing a selected number in the call log in the local database.

15. An enhanced telephony services management system as defined in claim 7 where the call log comprises a plurality of separate logs, each associated with a different user within the subscriber location.

16. An enhanced telephony services management system as defined in claim 7 wherein the call log comprises a plurality of separate logs, each identified with a separate telephone line associated with the subscriber location.

17. In an enhanced telephony management system, a method for managing received messages in a multi-user environment, the method comprising the steps of:
 a) displaying, on a graphical user interface, a menu of various users within the multi-user environment while simultaneously displaying programming received from a conventional broadcast television source;
 b) receiving, in the enhanced telephony management system, a menu selection corresponding to a particular user chosen from the various users displayed in step a);
 c) allowing accessing to received messages associated with the particular user; and
 d) displaying a log of received messages while simultaneously displaying programming received from a conventional broadcast television source, wherein the log of received messages corresponds to the particular user.

18. The method as defined in claim 17 wherein the graphical user interface is a television monitor.

19. The method as defined in claim 17 wherein the method further comprises the step of:
 e) receiving, in the telephony services management system, a call-back command from the particular user to initiate a return telephone call to a selected number associated with a received message.

20. The method as defined in claim 17 wherein the received messages are voice mail messages.

21. The method as defined in claim 17 wherein the received messages are e-mail messages.

22. The method as defined in claim 17 wherein the received messages are fax messages.

23. The method as defined in claim 17 wherein the received messages are video e-mail messages.

24. In an enhanced telephony management system, a method for managing personal telephone directories in a multi-user environment, the method comprising the steps of:
 a) displaying, on a graphical user interface and simultaneously with the displaying of programming from a conventional broadcast television source, a menu of various users within the multi-user environment;
 b) receiving, in the telephony management system, a menu selection corresponding to a particular user chosen from the various users displayed in step a);
 c) allowing access to a personal telephone directory associated with the particular user.

25. The method of claim 24 wherein the telephone directory is a locally-stored database of names and associated telephone numbers.

26. The method of claim 24 wherein in performing step c), the particular user is provided access to a network-based white pages directory.

27. The method of claim 24 wherein in performing step c), the particular user is provided access to a network-based yellow pages directory.

28. The method of claim 27 wherein the method further comprises the step of:
 d) updating the locally-stored database with information from a white pages listing, a yellow pages listing, or an incoming call.

* * * * *